US011415866B2

(12) United States Patent
Nakamura et al.

(10) Patent No.: US 11,415,866 B2
(45) Date of Patent: Aug. 16, 2022

(54) IMAGE CAPTURING APPARATUS HAVING BUILT-IN MICROPHONE

(71) Applicant: CANON KABUSHIKI KAISHA, Tokyo (JP)

(72) Inventors: Yuta Nakamura, Tokyo (JP); Yasuhiro Kojima, Inagi (JP); Hideki Toichi, Tokyo (JP); Hayato Mano, Tokyo (JP); Yusuke Mogi, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/307,506

(22) Filed: May 4, 2021

(65) Prior Publication Data
US 2021/0255527 A1 Aug. 19, 2021

Related U.S. Application Data

(63) Continuation of application No. 16/924,401, filed on Jul. 9, 2020, now Pat. No. 11,029,582.

(30) Foreign Application Priority Data

Aug. 20, 2019 (JP) .............................. JP2019-150319

(51) Int. Cl.
G03B 17/55 (2021.01)
G03B 17/14 (2021.01)
(Continued)

(52) U.S. Cl.
CPC ............. G03B 17/55 (2013.01); G03B 17/14 (2013.01); G03B 17/563 (2013.01); G03B 31/00 (2013.01); G02B 7/36 (2013.01); G03B 13/36 (2013.01)

(58) Field of Classification Search
CPC ...... G03B 17/14; G03B 17/55; G03B 17/561; G03B 17/563; G03B 31/00; H04N 1/00981
See application file for complete search history.

(56) References Cited

U.S. PATENT DOCUMENTS 4,547,815 A 10/1985 Kimura
2007/0166027 A1 7/2007 Misawa
(Continued)

FOREIGN PATENT DOCUMENTS

JP 2019095564 A 6/2019

OTHER PUBLICATIONS

Notice of Allowance issued in U.S. Appl. No. 16/924,401 dated Feb. 19, 2021.

Primary Examiner — Christopher E Mahoney
(74) Attorney, Agent, or Firm — Rossi, Kimms & McDowell LLP

(57) ABSTRACT

An image capturing apparatus having a forced air cooling function and capable of having an accessory attached thereto includes an image capturing apparatus body. A lens mount is provided on the apparatus body and can have a shooting lens removably attached thereto. An attachment portion is provided on the apparatus body and can have the accessory removably attached thereto. A built-in microphone is arranged on a side of a surface of the apparatus body, different from any of a surface where an air outlet port for discharging air used for forced cooling is arranged, a surface where the lens mount is arranged, and a surface where the attachment portion is arranged. The built-in microphone is arranged at a location closer to a top surface of the image capturing apparatus body than a bottom surface thereof.

5 Claims, 30 Drawing Sheets

(51) Int. Cl.
    *G03B 17/56*    (2021.01)
    *G03B 31/00*    (2021.01)
    G03B 13/36    (2021.01)
    G02B 7/36    (2021.01)

(56) References Cited

U.S. PATENT DOCUMENTS

2014/0055671 A1    2/2014    Kawamura
2015/0070557 A1    3/2015    Petty
2016/0295095 A1    10/2016    Jannard
2016/0301819 A1    10/2016    Petty
2017/0261840 A1    9/2017    Yoneda
2017/0366746 A1*    12/2017    Yu .......................... F16M 11/14
2018/0376037 A1    12/2018    Arai
2019/0243217 A1    8/2019    Park

* cited by examiner

IMAGE CAPTURING APPARATUS HAVING BUILT-IN MICROPHONE

BACKGROUND OF THE INVENTION

Field of the Invention

The present invention relates to an image capturing apparatus having a built-in microphone.

Description of the Related Art

Professional digital video cameras for video production often use an external microphone to record the voice of a person as an object and environmental sound with higher sound quality simultaneously with shooting a video. Some professional digital video cameras are equipped with a built-in microphone, separately from the above-mentioned external microphone, mainly for collecting the voice of a shooter to record the voice as a memo for use in checking and editing shot video data.

Power consumption of the digital video camera has increased in accordance with higher resolution and higher frame rate achieved in recent years. For this reason, digital video cameras equipped with a forced cooling mechanism for cooling heat sources with outside air using a fan are mainstream products. However, there is a fear that vibrations, mechanical noise, and electrical noise, generated by the fan of the forced cooling mechanism affects recording using the built-in microphone.

To cope with this, a configuration of an image capturing apparatus is known in which a built-in microphone is disposed on a front side of the image capturing apparatus together with a lens mount, and a fan is arranged toward a rear side of the same, whereby the built-in microphone is made distant from the fan as a noise source (see e.g. Japanese Laid-Open Patent Publication (Kokai) No. 2019-95564).

However, this configuration has the following problem:

First, an interchangeable lens (a shooting lens) attached to the lens mount can be a noise source due to driving noise generated during autofocus, etc. In the configuration disclosed in Japanese Laid-Open Patent Publication (Kokai) No. 2019-95564, since the built-in microphone is arranged on a side where the lens mount is provided, the built-in microphone can be affected by the noise generated by the interchangeable lens. Further, a shooter rarely performs shooting in a state standing before the front side of the apparatus where the lens mount is provided. Therefore, as for professional digital video cameras including those for video production, which use a built-in microphone for recording shooter's voice as a memo, if the built-in microphone is arranged on the side where the lens mount is provide as in Japanese Laid-Open Patent Publication (Kokai) No. 2019-95564, there is a fear that it is difficult to collect the voice of a shooter.

SUMMARY OF THE INVENTION

The present invention provides an image capturing apparatus including a built-in microphone, which is configured to collect the voice of a shooter with ease while reducing the influence of mechanical noise and electrical noise.

The present invention provides an image capturing apparatus having a forced air cooling function and capable of having an accessory attached thereto, comprising an image capturing apparatus body including an image sensor, a lens mount which is provided on the image capturing apparatus body and to which a shooting lens can be removably attached, an attachment portion which is provided on the image capturing apparatus body and to which the accessory can be removably attached, and a built-in microphone which is arranged on a side of a surface of the image capturing apparatus body, different from any of a surface where an air outlet port for discharging air used for forced cooling is arranged, a surface where the lens mount is arranged, and a surface where the attachment portion is arranged, wherein the built-in microphone is arranged at a location closer to a top surface of the image capturing apparatus body than a bottom surface thereof.

According to the present invention, it is possible to collect the voice of a shooter with ease while reducing the influence of mechanical noise and electrical noise.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
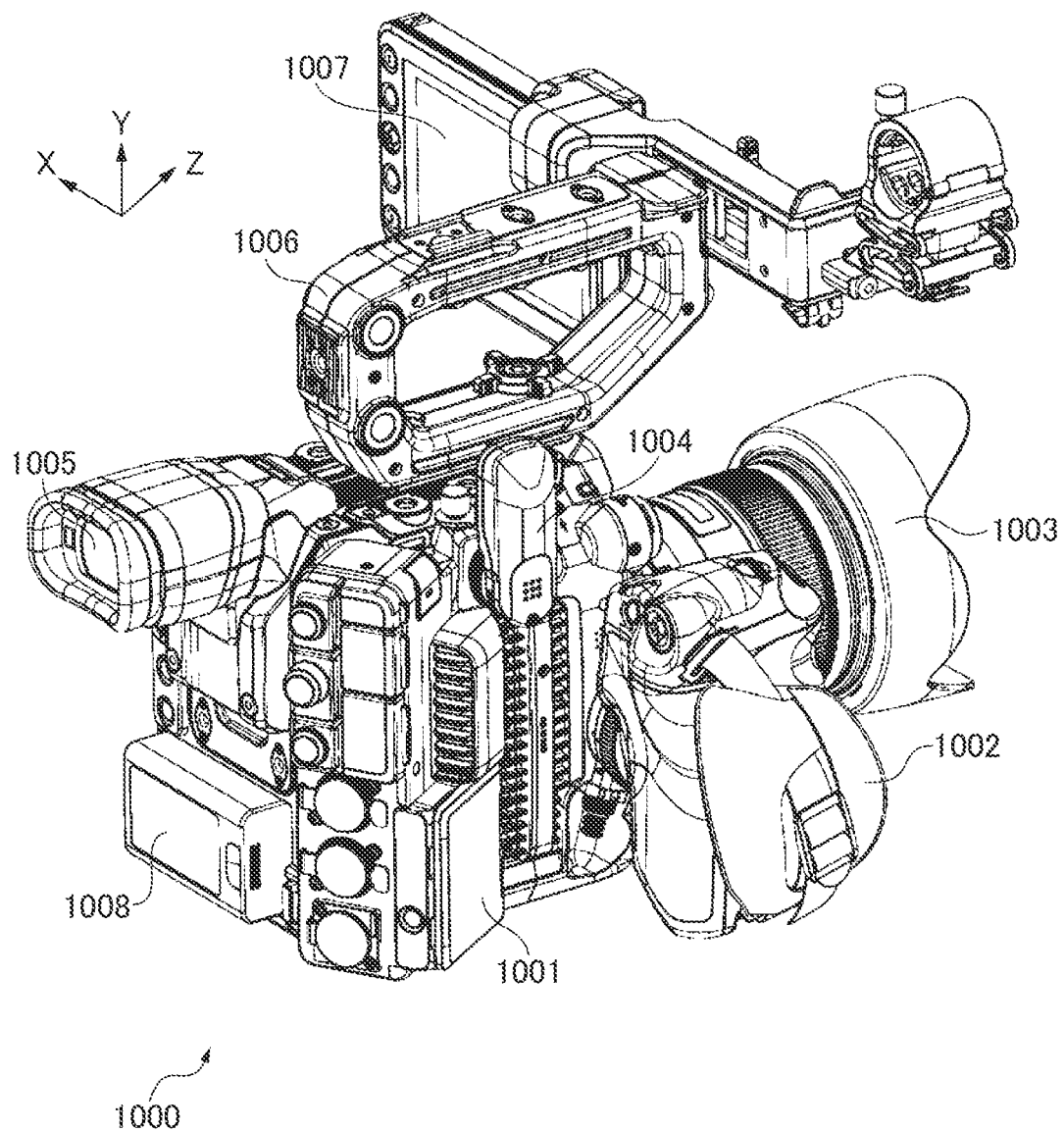
FIG. 1 is a perspective view showing the appearance of an image capturing system.
Figure 2:
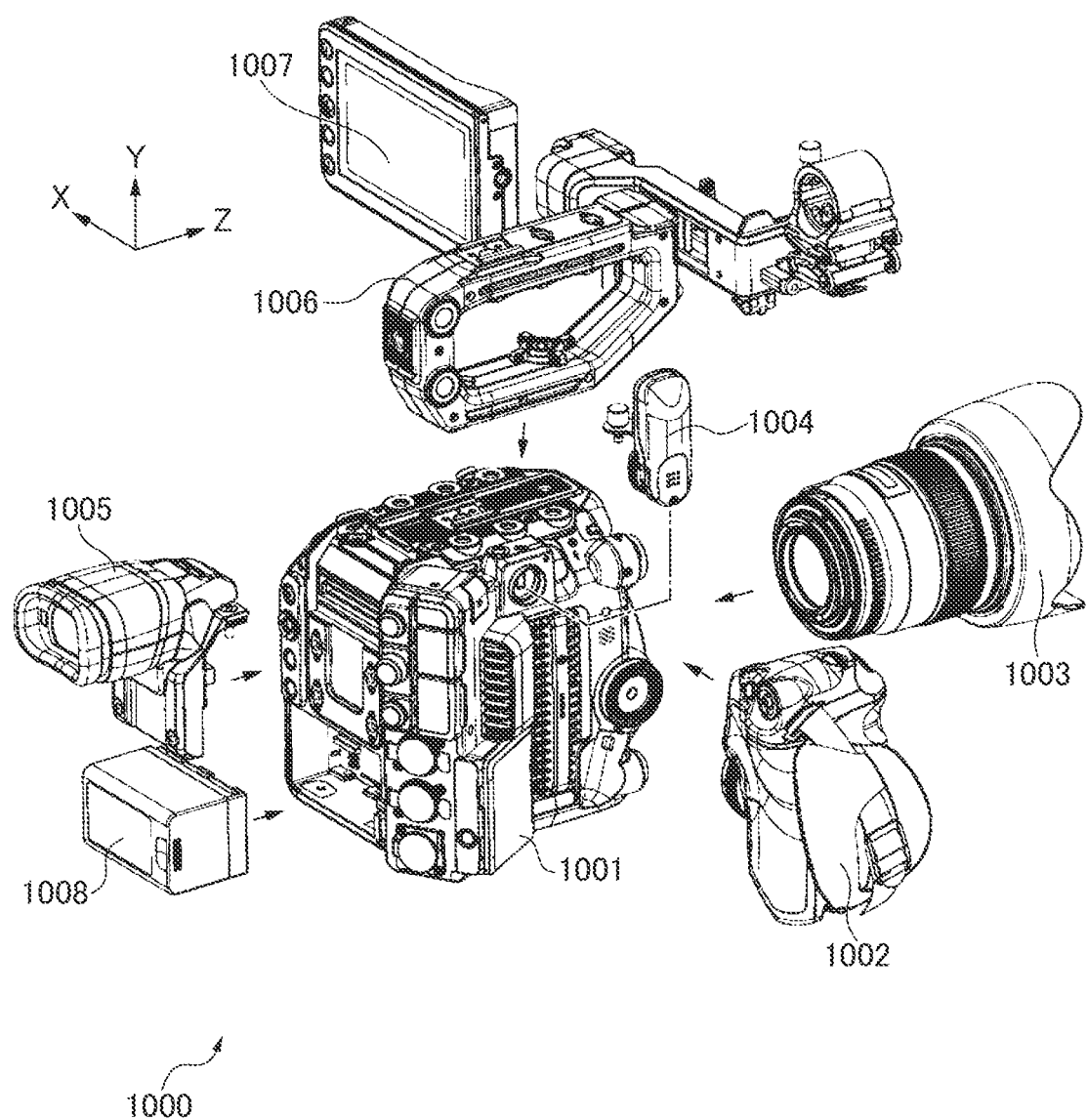
FIG. 2 is a perspective view of the image capturing system in a state in which attached units are removed from an image capturing apparatus body.

FIG. 1 is a perspective view showing the appearance of an image capturing system including an image capturing apparatus according to an embodiment of the present invention. This image capturing system, denoted by reference numeral 1000, is formed by attaching a plurality of attachment units to an image capturing apparatus body 1001. The attachment units include a grip unit 1002, a lens barrel 1003, a wireless unit 1004, a viewfinder unit 1005, a handle 1006, a panel unit 1007, and a battery 1008. FIG. 2 is a perspective view of the image capturing system 1000 in a state in which the attachment units are removed from the image capturing apparatus body 1001.

The image capturing apparatus body 1001 is configured e.g. as a digital video camera capable of shooting a moving image. The grip unit 1002, the lens barrel 1003, the wireless unit 1004, the viewfinder unit 1005, and the panel unit 1007 are each electrically connected to the image capturing apparatus body 1001 by a connection section included therein.

Note that the image capturing apparatus body 1001 may be referred to as the image capturing apparatus of the present invention. Alternatively, the image capturing system 1000 may be referred to as the image capturing apparatus of the present invention. Further, the image capturing apparatus body 1001 having at least one of the plurality of attachment units given as examples, attached thereto in advance, may be referred to as the image capturing apparatus of the present invention. For example, a lens-integrated apparatus formed by integrating the image capturing apparatus body 1001 and a shooting lens, such as the lens barrel 1003, may be referred to as the image capturing apparatus. Hereafter, the image capturing apparatus body 1001 is sometimes described as the "apparatus body 1001" in an abbreviated form.

Note that directions of each component of the image capturing system 1000 are referred to with reference to X, Y, and Z coordinate axes shown in FIG. 1 and other figures. Here, in a direction of a shooting optical axis of the attached lens barrel 1003, a direction toward an object (front side) is referred to as "forward", and a direction toward a shooter is referred to as "rearward" for convenience of explanation. Therefore, for example, in FIGS. 1 and 2, a +Y direction is defined as "upward", and a +Z direction is defined as "forward". A +X direction as viewed from an object side is defined as "rightward". Z directions are parallel to the optical axis direction.

Figure 3:
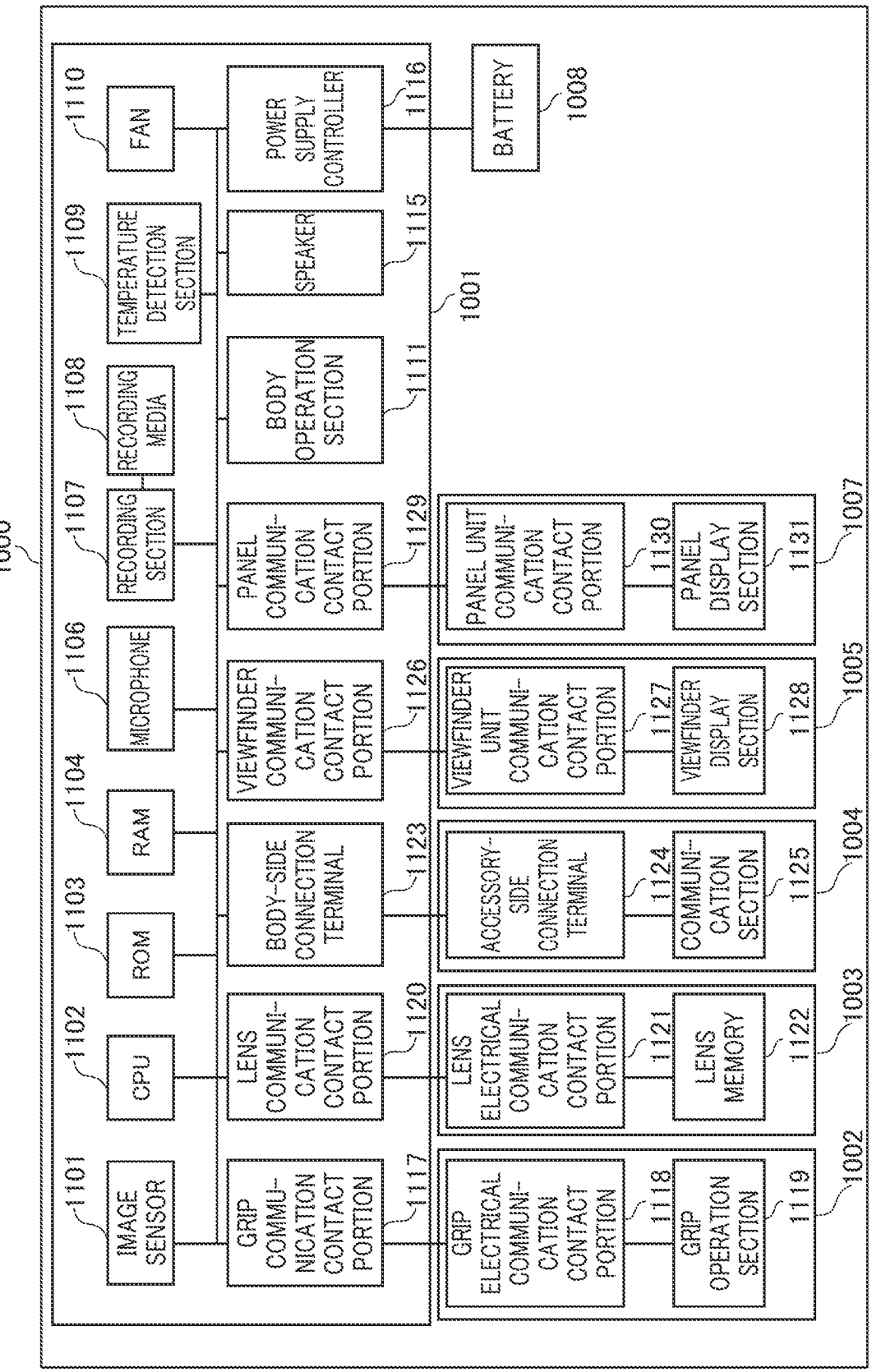
FIG. 3 is a schematic block diagram of the image capturing system.

FIG. 3 is a schematic block diagram of the image capturing system 1000. The functional configuration of the image capturing system 1000 will be described with reference to FIG. 3.

The apparatus body 1001 includes an image sensor 1101, and the image sensor 1101 includes a CCD or CMOS image sensor, and an analog-to-digital converter. An optical image is formed on the CCD or CMOS image sensor via the lens barrel 1003. The CCD or CMOS image sensor outputs electrical signals (analog signals) corresponding to the optical image, and the analog-to-digital converter converts the analog signals to digital signals to output the digital signals as image data.

The apparatus body 1001 includes a CPU 1102, a ROM 1103, and a RAM 1104, and these components are mounted on a main processing circuit board 1105 (see FIG. 8A), described hereinafter. The ROM 1103 is an electrically erasable and recordable memory, and is implemented, for example, by an EEPROM. The ROM 1103 stores constants, programs, etc. for the operation of the CPU 1102. The CPU 1102 realizes the centralized control of the apparatus body 1001. The CPU 1102 executes processes by executing the programs stored in the ROM 1103. The RAM 1104 is used as a system memory, a work memory, an image memory, and an audio memory. The constants, variables, and the programs read from the ROM 1103, etc., for the operation of the CPU 1102 are loaded into the RAM 1104.

Video data converted by the image sensor 1101, and audio signals input from a built-in microphone 1106 and subjected to gain control to a predetermined level and thereafter converted from analog to digital are temporarily stored in the RAM 1104. The CPU 1102 sends the video data and audio data stored in the RAM 1104 to a recording section 1107. Recording media 1108 can be inserted and removed into and from the recording section 1107 of the apparatus body 1001. The video data and the audio data are recorded in the inserted recording media 1108. As the recording media 1108, removal flash memories, such as SD cards, are used.

In the main processing circuit board 1105, heat is generated in accordance with various processing operations performed by the CPU 1102, the ROM 1103, the RAM 1104, etc. To cope with this, a temperature detection section 1109, such as a thermistor, is mounted on the main processing circuit board 1105. The apparatus body 1001 is provided with a fan 1110 for air cooling. The rotational state of the fan 1110 is controlled by the CPU 1102 based on a temperature detected by the temperature detection section 1109.

A body operation section 1111 is operated by a user and provides various instructions to the CPU 1102. The body operation section 1111 includes a body REC button 1112, a power switch 1113, and a body operation button group 1114 (see FIG. 4). An operation sound generated when the body operation section 1111 is operated and a beep generated when recording of a video is started/stopped are output from a speaker 1115 under the control of the CPU 1102. A power supply controller 1116 is comprised of a battery detection circuit, a DC-DC converter, a switch circuit for switching blocks to be energized, and so forth, and detects whether or not a battery is attached, a battery type, and a battery remaining amount. The battery 1008 is e.g. a lithium ion battery and supplies electrical power to the apparatus body 1001.

When a grip communication contact portion 1117 of the apparatus body 1001 and a grip electrical communication contact portion 1118 of the grip unit 1002 are brought into contact with each other to be electrically connected to each other, the CPU 1102 can detect attachment of the grip unit 1002. Operation inputs from a grip operation section 1119 of the grip unit 1002 give various instructions to the CPU 1102 of the apparatus body 1001. When a lens communication contact portion 1120 of the apparatus body 1001 and a lens electrical communication contact portion 1121 of the lens barrel 1003 are brought into contact with each other to be electrically connected to each other, the CPU 1102 can detect attachment of the lens barrel 1003. When attachment of the lens barrel 1003 is detected, the CPU 1102 reads lens information from a lens memory 1122, and stores the read lens information in the RAM 1104.

The wireless unit 1004 is an example of an accessory which enables wireless connection to an external device. When a body-side connection terminal 1123 of the apparatus body 1001 and an accessory-side connection terminal 1124 of the wireless unit 1004 are brought into contact with each other to be electrically connected to each other, the CPU 1102 can detect attachment of the wireless unit 1004. When attachment of the wireless unit 1004 is detected, the CPU 1102 sends video data and audio data stored in the RAM 1104 to the wireless unit 1004. The apparatus body 1001 can transmit the video data and the audio data from a communication section 1125 of the wireless unit 1004 to an external device.

When a viewfinder communication contact portion 1126 of the apparatus body 1001 and a viewfinder unit communication contact portion 1127 of the viewfinder unit 1005 are brought into contact with each other to be electrically connected to each other, the CPU 1102 can detect attachment of the viewfinder unit 1005. When attachment of the viewfinder unit 1005 is detected, the CPU 1102 sends video data and audio data stored in the RAM 1104 to the viewfinder unit 1005. A viewfinder display section 1128 of the viewfinder unit 1005 displays the operating status of the apparatus body 1001 as on-screen display information as required.

When a panel communication contact portion 1129 of the apparatus body 1001 and a panel unit communication contact portion 1130 of the panel unit 1007 are brought into contact with each other to be electrically connected to each other, the CPU 1102 can detect attachment of the panel unit 1007. When attachment of the panel unit 1007 is detected, the CPU 1102 sends video data and audio data stored in the RAM 1104 to the panel unit 1007. A panel display section 1131 of the panel unit 1007 displays the operating status of the apparatus body 1001 as on-screen display information as required. Note that the information items displayed on the panel display section 1131 and the viewfinder display section 1128 are sometimes identical to each other or sometimes different from each other depending on a user operation.

In the image capturing system 1000 of the present embodiment, for example, light received by the image sensor 1101 is converted to digital image data of at least approximately 23 frames per second (fps), and the digital image data is recorded in one of the recording media 1108 by the recording section 1107. The frame rate can be set within a range from approximately 1 fps to not lower than approximately 250 fps. For example, the image capturing system 1000 may change the frame rate according to a set resolution. More specifically, a frame rate within a range from approximately 1 fps to approximately 100 fps is set in a "5K" resolution mode, a frame rate within a range from approximately 1 fps to approximately 125 fps is set in a "4K" resolution mode, and a frame rate within a range from approximately 1 fps to approximately 125 fps is set in a Quad HD mode. A frame rate within a range from approximately 1 fps to approximately 160 fps is set in a "3K" resolution mode, and a frame rate within a range from approximately 1 fps to approximately 250 fps is set in a "2K" resolution mode. For example, as the frame rate, 20, 23.976, 24, 30, 60 and 120 fps, or other frame rates between these frame rates, or frame rates not lower than these frame rates may be set.

The image capturing system 1000 can output image data at a resolution of "2K" (such as 16:9 (2048×1152 pixels) and 2:1 (2048×1024 pixels)), a resolution of "3K" (such as 16:9 (3072×1728 pixels) and 2:1 (3072×1536 pixels)), a resolution of "4K" (such as 4096×2540 pixels, 16:9 (4096×2304 pixels), and 2:1 (4096×2048 pixels)), a resolution of "4.5K", a resolution of Quad HD (such as 3840×2160 pixels), a resolution of "5K" (such as 5120×2700 pixels), a resolution of "6K" (such as 6144×3160 pixels), a resolution of "8K" (such as 7680×4320 pixels), or a resolution higher than 8K. The image capturing system 1000 can be configured to record or output image data having a horizontal resolution at least between any values of the above-mentioned resolutions.

Further, the resolution is at least one of the above-mentioned values (or some value between the above-mentioned values), and can take approximately 6.5K, 7K, 8K, 9K, or 10K, or some value between the above-mentioned values. In the present embodiment, in information expressed in the form of xK (such as the above-mentioned 2K and 4K), the number of "x" refers to an approximate horizontal resolution. Therefore, the resolution of "4K" corresponds to the number of horizontal pixels which is approximately not smaller than 4000, and the resolution of "2K" corresponds to the number of horizontal pixels which is approximately not smaller than 2000.

The image sensor 1101 can be adapted to a size from approximately 0.5 inch (8 mm) to ⅔ inch, S35 for a movie, 35 mm full-frame for a still camera, and up to 645 (medium size). Further, the image sensor 1101 can have sizes of approximately 10.1 mm×5.35 mm, 24.4 mm×13.7 mm, 30 mm×15 mm, 36 mm×24 mm, 56 mm×42 mm, and 186×56 mm. Further, the image sensor 1101 can be configured to provide a variable resolution by selectively outputting only predetermined part of the pixel area. The image sensor 1101 can include e.g. color filters arranged in the Bayer array. Therefore, the image sensor 1101 outputs data indicating an amount of red light, green light, or blue light, detected by each photoelectric conversion element of the image sensor 1101.

Figure 4:
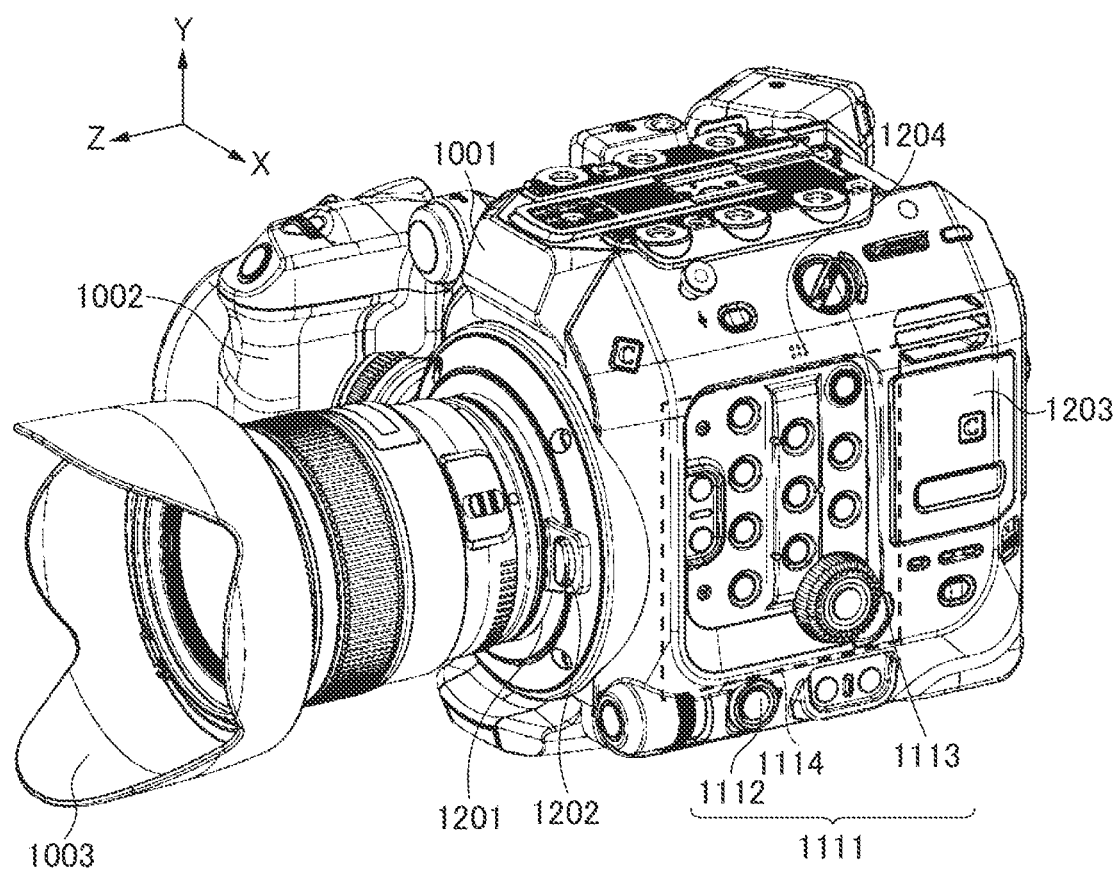
FIG. 4 is a front perspective view of the image capturing apparatus body in a state in which a grip unit and a lens barrel are attached thereto.
Figure 5:
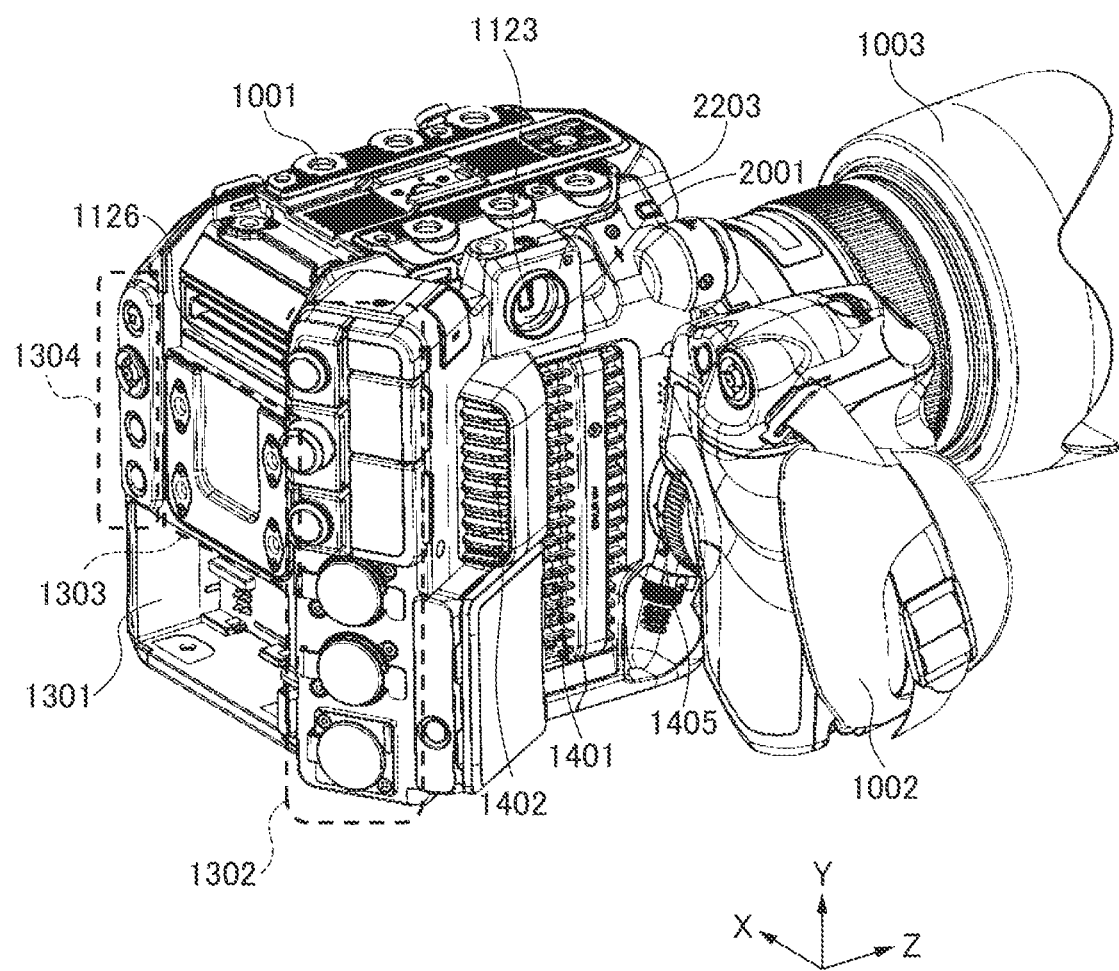
FIG. 5 is a rear perspective view of the image capturing apparatus body in the state in which the grip unit and the lens barrel are attached thereto.
Figure 6:
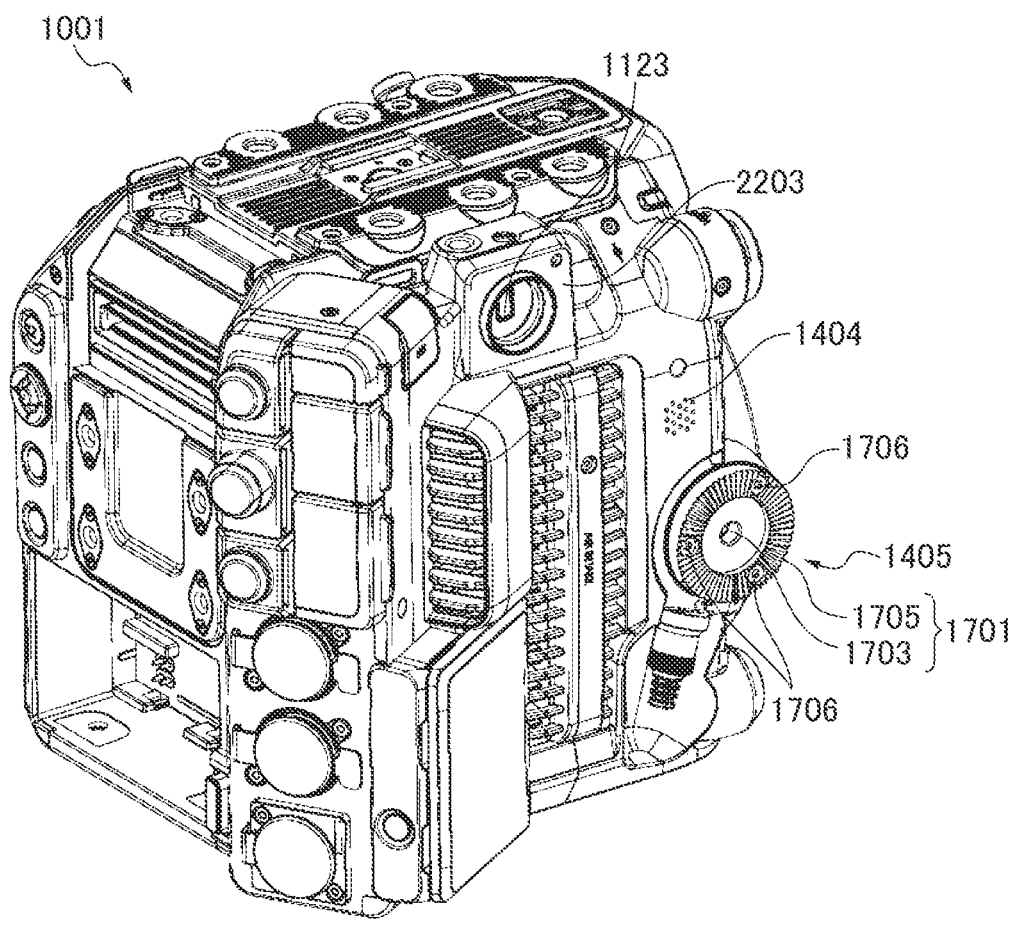
FIG. 6 is a rear perspective view of the image capturing apparatus body.
Figure 7:
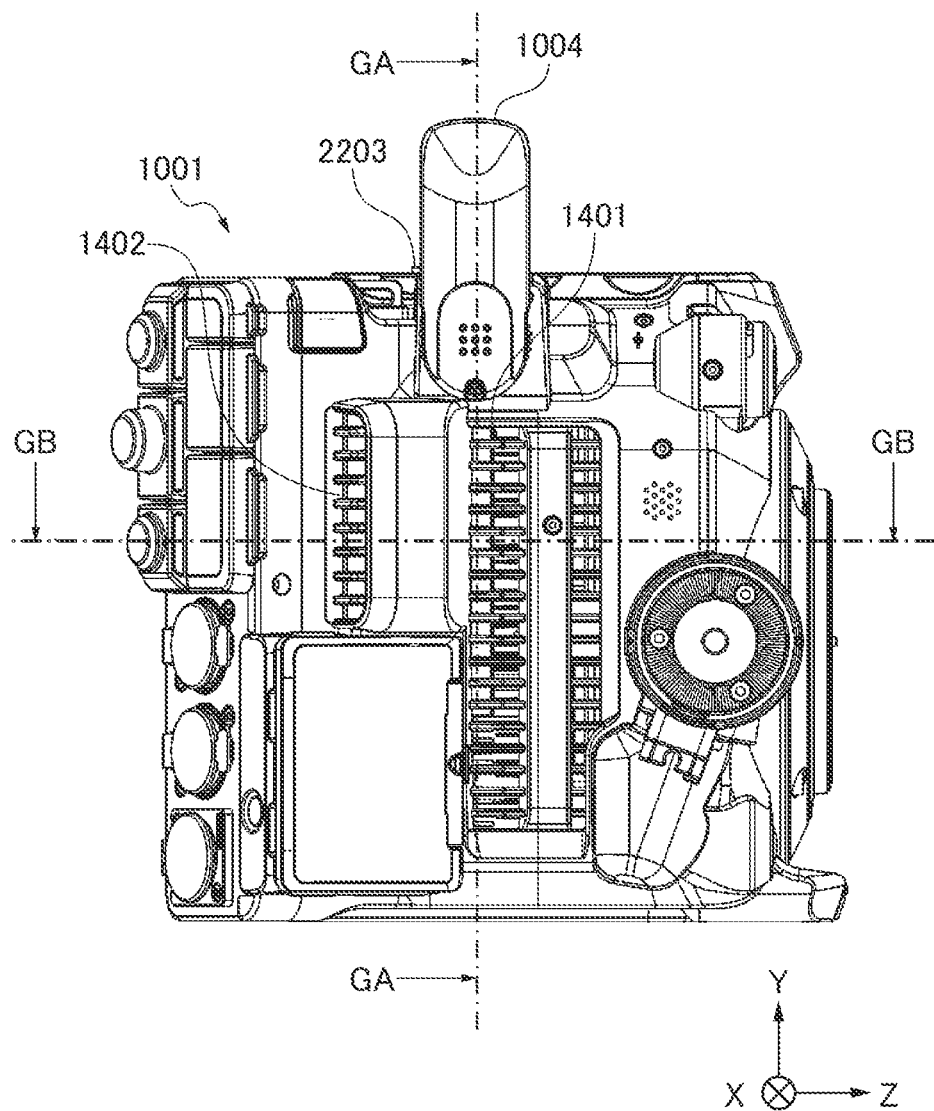
FIG. 7 is a left side view of the image capturing apparatus body in a state in which a wireless unit is attached thereto.

FIGS. 4 and 5 are a front perspective view and a rear perspective view of the apparatus body 1001 in a state in which the grip unit 1002 and the lens barrel 1003 are attached thereto, respectively. FIG. 6 is a rear perspective view of the apparatus body 1001. FIG. 7 is a left side view of the apparatus body 1001 in a state in which the wireless unit 1004 is attached thereto.

As shown in FIG. 4, the front side of the apparatus body 1001 is provided with a lens mount 1201, the lens communication contact portion 1120 (see FIG. 3; not shown in FIG. 4), and a lens release button 1202. The lens barrel 1003 is removably supported on the lens mount 1201. The lens release button 1202 is operated by a user (shooter) when removing the lens barrel 1003 attached to the apparatus body 1001.

Further, although not shown, within the apparatus body 1001, at respective locations rearward of the lens mount 1201, there are disposed the image sensor 1101 that receives light from an object to generate video signals and a sensor circuit board that converts the video signals obtained by the image sensor 1101 to predetermined signals. The right side of the apparatus body 1001 as viewed from the front is provided with the body operation section 1111 including the body REC button 1112, the power switch 1113, and the body operation button group 1114. The apparatus body 1001 executes an operation according to an operation input by the shooter to the body operation section 1111. Further, the apparatus body 1001 includes an accommodating cover 1203 for accommodating the recording media 1108 (see FIG. 3) and microphone holes 1204 for collecting sound for the microphone 1106 (see FIG. 3), which are provided on the right side thereof.

As shown in FIG. 5, the rear side of the apparatus body 1001 is provided with a battery receiving section 1301 for receiving the battery 1008, and an input/output terminal group 1302 including an external connection terminal and a power supply terminal. Further, the rear side (rear surface) of the apparatus body 1001 is provided with a fixing section 1303 for fixing the viewfinder unit 1005 and the viewfinder communication contact portion 1126. Further, a body rear side operation section 1304 as part of the body operation section 1111 is provided on the rear side of the apparatus body 1001.

As shown in FIG. 6, the left side of the apparatus body 1001 is provided with an attachment mechanism 1405. The attachment mechanism 1405 includes a body-side attachment member 1701 to which the grip unit 1002 can be attached. The body-side attachment member 1701 is fixed to the apparatus body 1001 with screws 1706. The body-side attachment member 1701 has a substantially disc-like shape and includes a body-side screw 1703 provided in the center thereof. A grip-side screw 1702 (see FIG. 12) of the grip unit 1002, referred to hereinafter, is screwed into the body-side screw 1703. Further, the attachment mechanism 1405 has a body-side engagement portion 1705 to be engaged with a grip-side engagement portion 1704 (see FIG. 12) of the grip unit 1002. The body-side engagement portion 1705 has protruding-shape portions and recessed-shape portions, each formed to radially extend and arranged alternately around the center of the attachment mechanism 1405 at predetermined spaced intervals in a circumferential direction. The body-side engagement portion 1705 is engaged with the grip-side engagement portion 1704 (see FIG. 12) having recessed-shape portions and protruding-shape portions, associated with those of the body-side engagement portion 1705. With this engagement, the grip unit 1002 and the apparatus body 1001 are firmly fixed to each other.

Further, the left side of the apparatus body 1001 is provided with speaker holes 1404 for emitting sound from the speaker 1115 (see FIG. 3) and an accessory attachment portion 2203 for having the wireless unit 1004 attached thereto. The accessory attachment portion 2203 has the body-side connection terminal 1123.

Figure 8A:
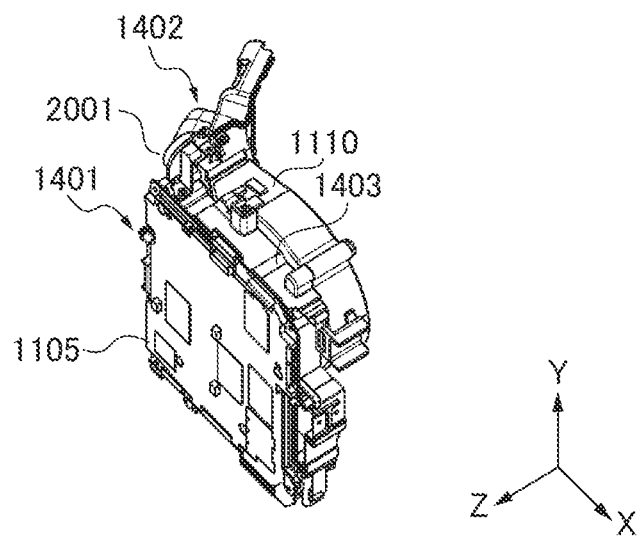
FIG. 8A is a perspective view of members related to cooling of the inside of the image capturing apparatus body, in an assembled state.
Figure 8B:
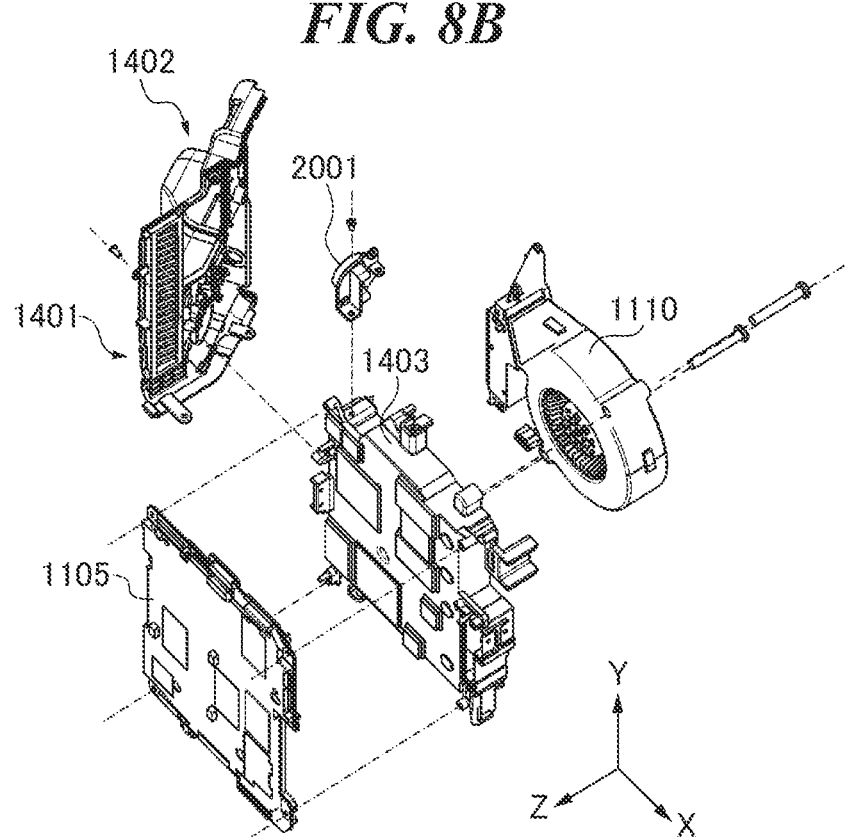
FIG. 8B is an exploded perspective view of the members related to cooling of the inside of the image capturing apparatus body.
Figure 9:
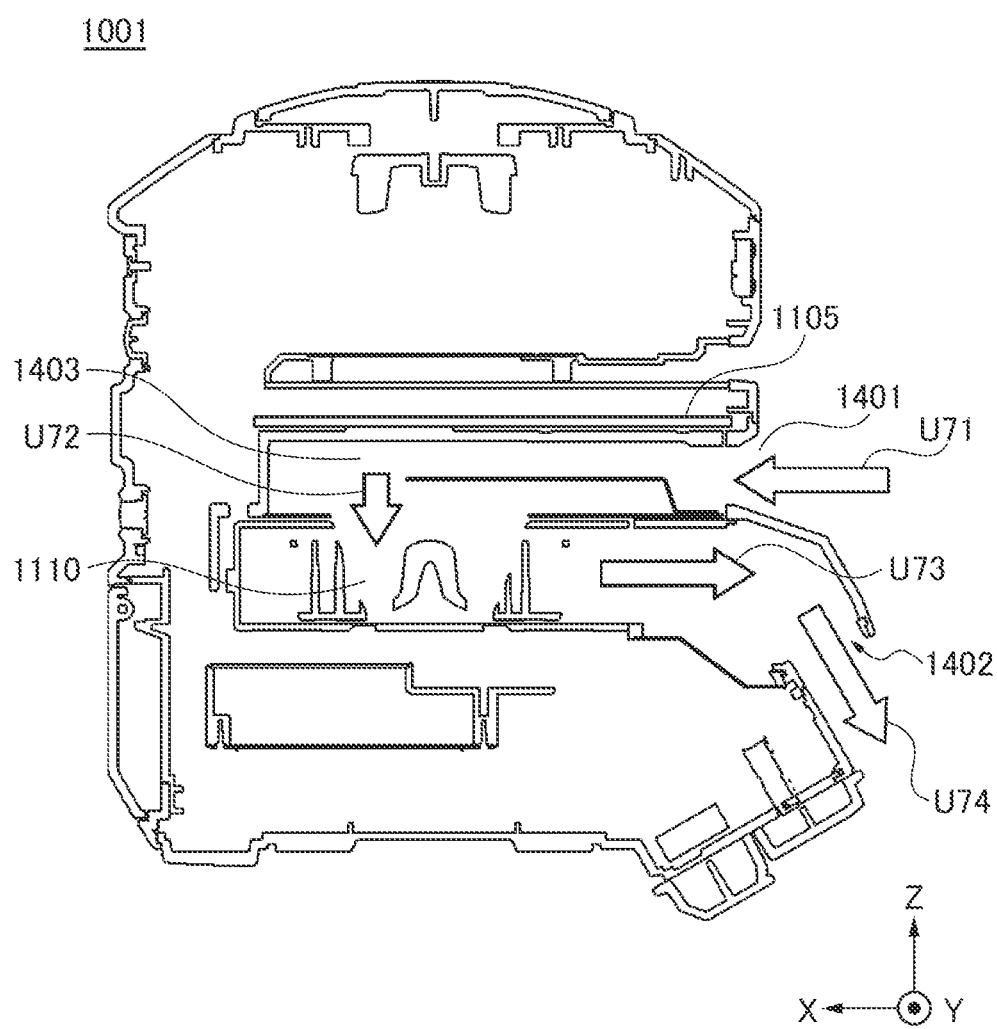
FIG. 9 is a cross-sectional view taken along line GB-GB in FIG. 7.

FIGS. 8A and 8B are a perspective view and an exploded perspective view of members related to cooling of the inside of the apparatus body 1001, respectively. FIG. 9 is a cross-sectional view taken along line GB-GB in FIG. 7, showing a duct structure within the apparatus body 1001. A structure for realizing a forced air cooling function of the image capturing system 1000 will be described with reference to FIGS. 8A, 8B, and 9.

The apparatus body 1001 has a main duct 1403 as a duct portion forming an air flow passage through which air used for forced cooling flows. An air inlet port 1401 and an air outlet port 1402 are formed in a left side surface of the apparatus body 100 (see FIGS. 5, 7, and 9). The air inlet port 1401 and the air outlet port 1402 are an opening for drawing air for forced cooling and an opening for discharging the air, respectively.

As shown in FIG. 9, air taken in via the air inlet port 1401 as indicated by an arrow U71 flows through the main duct 1403. At this time, heat from the main processing circuit board 1105, etc., is transferred to the air. After that, the heated air passes through the fan 1110 as indicated by arrows U72 and U73, and is discharged from the air outlet port 1402 as indicated by an arrow U74.

In the image capturing system 1000 of the present embodiment, it is assumed that a shooter carries the apparatus body 1001 on his/her right shoulder when shooting. Therefore, the head of the shooter is adjacent to the right side of the apparatus body 1001 as viewed from the front of the apparatus body 1001. However, since the air outlet port 1402 of the apparatus body 1001 is arranged on the left side of the apparatus body 1001, exhaust wind does not blow against the head of the shooter, which prevents the shooter from being made uncomfortable.

Figure 10:
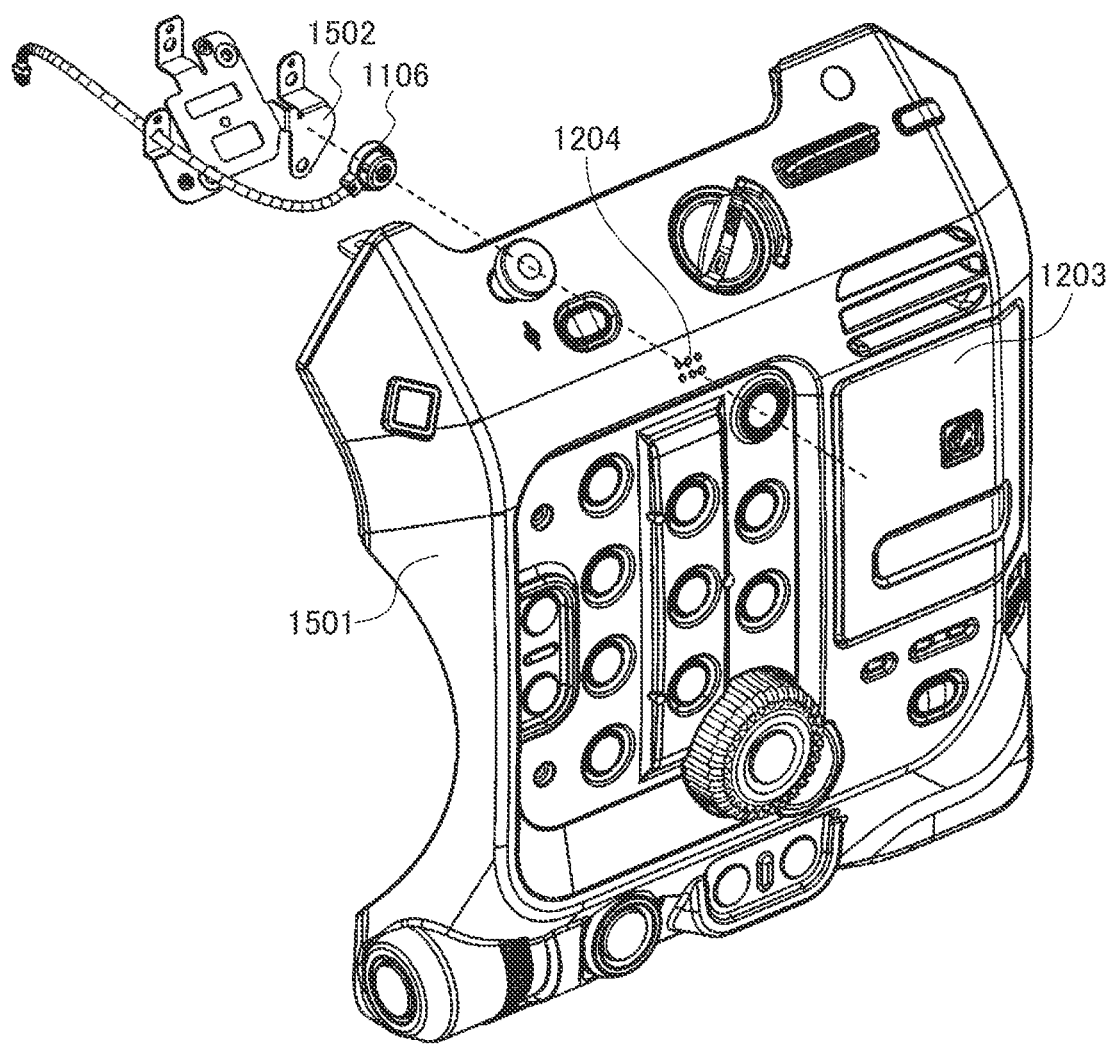
FIG. 10 is an exploded perspective view of a microphone and members associated therewith.
Figure 11:
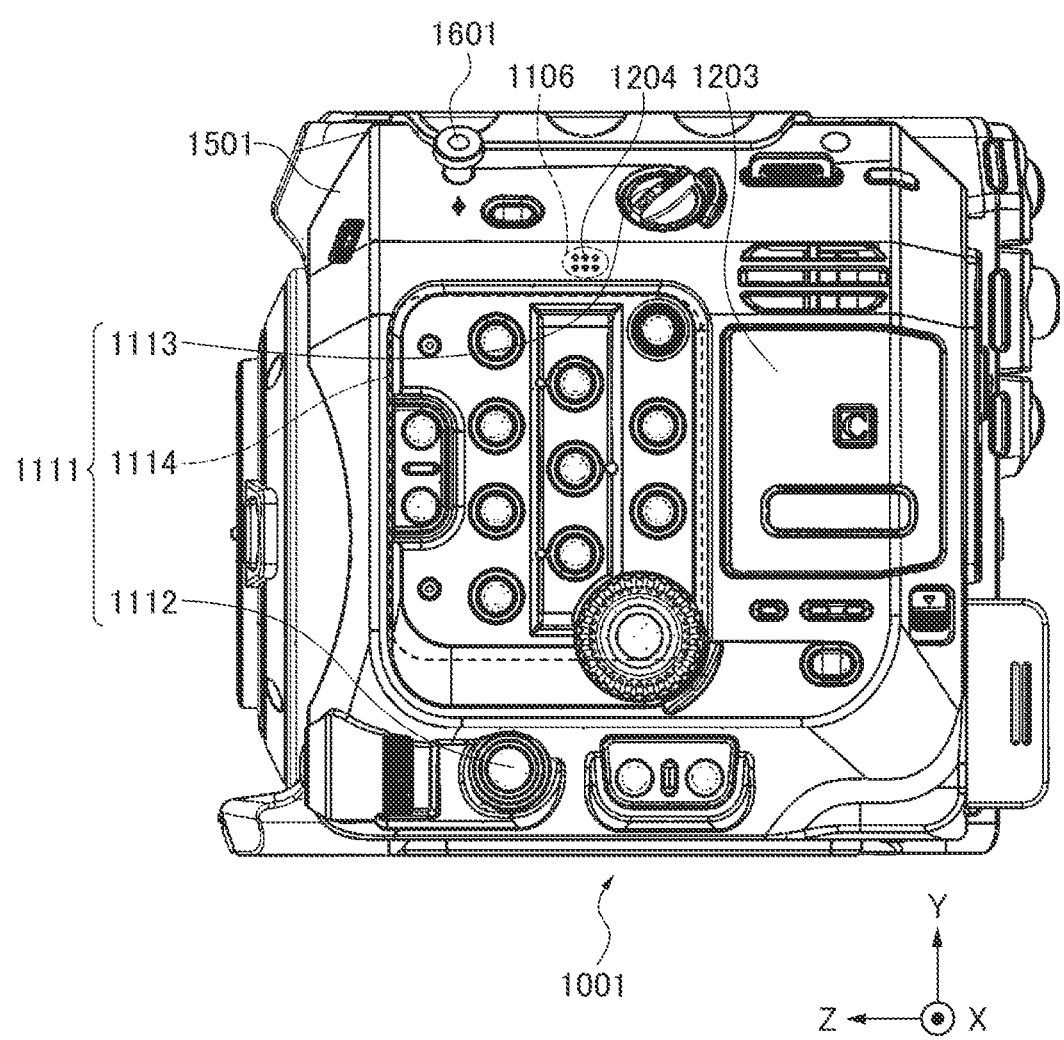
FIG. 11 is a right side view of the image capturing apparatus body.

FIG. 10 is an exploded perspective view of the microphone 1106 and its surroundings. FIG. 11 is a right side view of the apparatus body 1001. As described hereinabove, the body operation section 1111, the accommodating cover 1203, and the microphone holes 1204 are arranged on the right side of the apparatus body 1001. The microphone 1106 is fixed between a right-side exterior cover 1501 and a microphone-holding member 1502 e.g. with a screw, not shown. The microphone holes 1204 are arranged close to a shadow of the microphone 1106 projected onto the right-side exterior cover 1501 in the +X direction.

In general, a shooter stands on the right side of the apparatus body 1001 when the shooter performs basic operations of the apparatus body 1001, such as a power-on/off operation, various setting operations, a recording operation, and an operation for inserting/removing any of the recording media 1108. Further, when the shooter performs shooting with the apparatus body 1001 on his/her right shoulder, the right side of the head of the shooter is close to the right side of the apparatus body 1001.

A professional digital video camera for video production, in particular, often uses an external microphone so as to record the voice of a person as an object with higher sound quality. In this case, a built-in microphone of the digital video camera is usually used to record voice as a memo for use in checking and editing shot video data, and hence the built-in microphone is mainly used for collecting the voice of a shooter. In the present embodiment, the built-in microphone 1106 is located on the same side as a surface (right side) where the body operation section 1111 is disposed and insertion/removal of any of the recording media is performed, and hence this makes it easy to collect the voice of the shooter when the shooter operates the apparatus body 1001 and performs shooting.

When the shooter performs shooting while carrying the image capturing system 1000 by hand, the shooter holds the grip unit 1002 as a grip portion with his/her right hand, and supports the bottom surface and surroundings of the REC button 1112 (lower portion of the right side) of the image capturing system 1000 with his/her left hand. Further, it is assumed that the shooter frequently operates the body operation button group 1114 and inserts/removes one of the recording media 1108, after turning on the power of the apparatus body 1001. Here, the microphone 1106 is disposed at a location closer to a top surface (upper surface) of the apparatus body 1001 than the bottom surface of the apparatus body 1001, with respect to the Y direction. Therefore, when holding the apparatus body 1001 by hand, or when operating the body operation button group 1114, or when inserting/removing any of the recording media 1108, it rarely occurs that the shooter inadvertently covers the microphone holes 1204 with his/her hand.

As shown in FIG. 11, a measure pin 1601 is disposed on an upper portion of the apparatus body, and the location of the measure pin 1601 in the optical axis direction corresponds to a plane on which the image sensor 1101 is disposed. The measure pin 1601 is used when the shooter measures a distance from the image sensor 1101 to an object using a measure. The microphone 1106 is disposed at a location rearward of the image sensor 1101 and distant from the lens mount 1201 in the optical axis direction. That is, the microphone 1106 is arranged on an opposite side of the image sensor 1101 to the lens mount 1201 in the optical axis direction. Various types of the lens barrel 1003 can be attached to the lens mount 1201. Since the microphone 1106 is located rearward of the image sensor 1101, the microphone 1106 is less prone to be affected by driving noise of the lens barrel 1003 and electrical noise generated during autofocus operation.

It is desirable that the microphone 1106 is disposed at a location distant from a mechanical noise source and an electrical noise source so as to clearly collect the voice of a shooter. In the present embodiment, autofocus noise of the lens barrel 1003 and exhaust noise of the forced cooling structure are main mechanical noise sources. Further, the grip unit 1002, which is a rotation type, also becomes a noise source when being rotated. The wireless unit 1004 and the viewfinder unit 1005 (see both in FIG. 1) can also be noise sources. A device connected to the input/output terminal group 1302 (see FIG. 5) can be an electrical noise source for the microphone 1106.

To cope with this, the microphone (and the microphone holes 1204) is/are arranged on the surface (right side surface) of the apparatus body 1001 which is different from both of the surfaces where devices which can be a mechanical noise source and an electrical noise source are disposed or attached. First, the lens mount 1201 (see FIG. 4) is arranged on a front side surface, and the air outlet port 1402 (see FIG. 5), the body-side attachment member 1701 (see FIG. 6), and the accessory attachment portion 2203 (and the body-side connection terminal 1123) (see FIG. 6) are arranged on the left side surface. The viewfinder communication contact portion 1126 (see FIG. 5) is arranged on a rear side surface, and the input/output terminal group 1302 (see FIG. 5) is arranged on a left rear side surface. The microphone 1106 is arranged on the right side surface different from all of the front side surface, the left side surface, the rear side surface, and the left rear side surface. With this arrangement, the microphone 1106 is less prone to pick up mechanical noise and electrical noise. Particularly, the microphone 1106 is arranged on a surface of the image capturing apparatus body, opposite to the surface where the accessory attachment portion 2203 (see FIG. 6) is arranged and hence the microphone 1106 is less prone to pick up noise from the wireless unit 1004.

Figure 12:
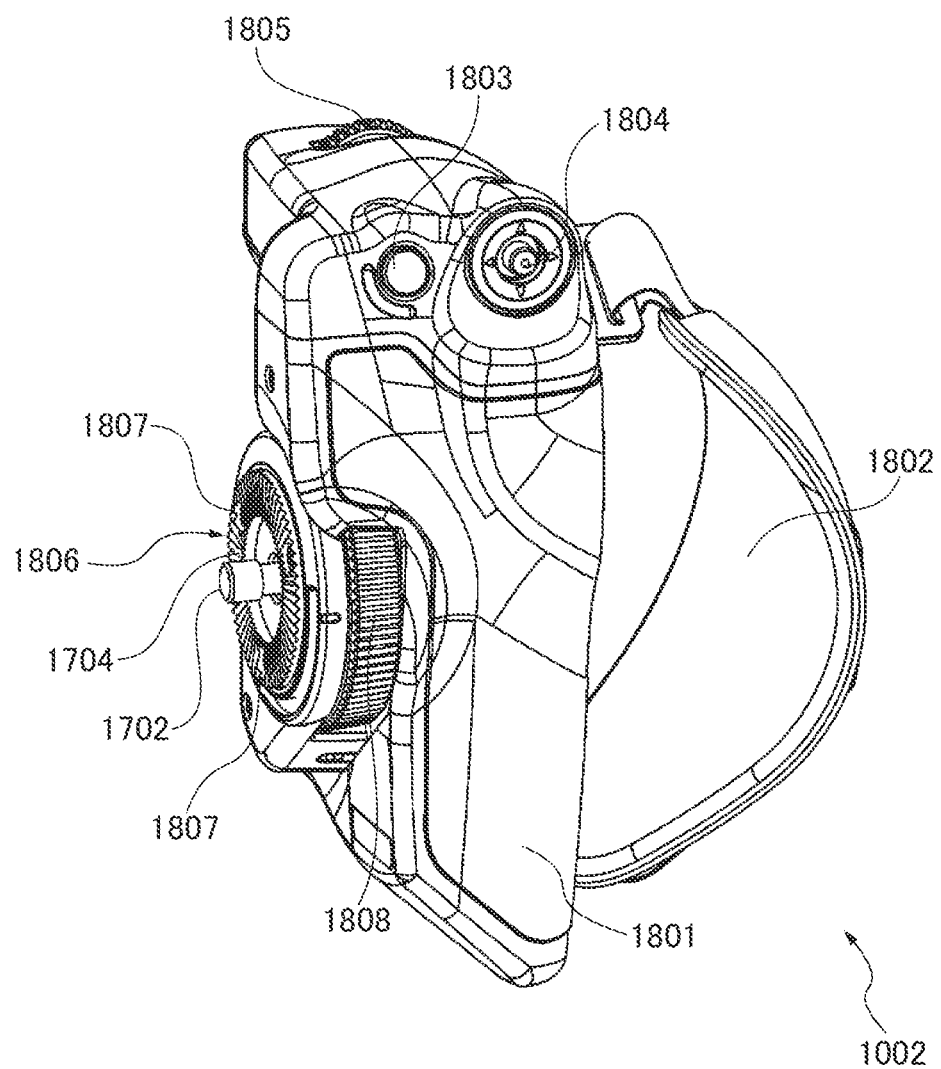
FIG. 12 is a rear perspective view of the grip unit.

FIG. 12 is a rear perspective view of the grip unit 1002. The grip unit 1002 is an example of an accessory that makes it easy for a user to hold the apparatus body 1001. A grasping portion 1801 is a portion which the user grasps by hand and has a shape conforming to the fingers of a human being. A grip belt 1802 is a member that is tightened to prevent a user's hand from being moved away from the grasping portion 1801. A grip REC button 1803, a cross key 1804, and an operation dial 1805 are operation members and are connected to the apparatus body 1001 by electrical wiring (not shown).

A grip-side attachment member 1806 is attached to the body-side attachment member 1701 (see FIG. 6) when the grip unit 1002 is attached to the apparatus body 1001, and has substantially the same size as the body-side attachment member 1701. The grip-side attachment member 1806 has the grip-side screw 1702 disposed in the center thereof for being screwed into the body-side screw 1703. The grip-side engagement portion 1704 to be engaged with the body-side engagement portion 1705 is provided outside the grip-side screw 1702. The grip-side engagement portion 1704 has the recessed-shape portions and protruding-shape portions radially arranged, similar to the body-side engagement portion 1705, from the center of the grip-side attachment member 1806 and is engaged with the body-side engagement portion 1705 to firmly fix the grip unit 1002 and the apparatus body 1001 to each other. The grip-side attachment member 1806 is fixed to the grip unit 1002 with screws 1807. The grip-side screw 1702 is mechanically connected to a tightening knob 1808. When attaching the grip unit 1002 to the apparatus body 1001, the user can rotate the grip-side screw 1702 by rotating the tightening knob 1808 exposed to the outside.

Figure 13:
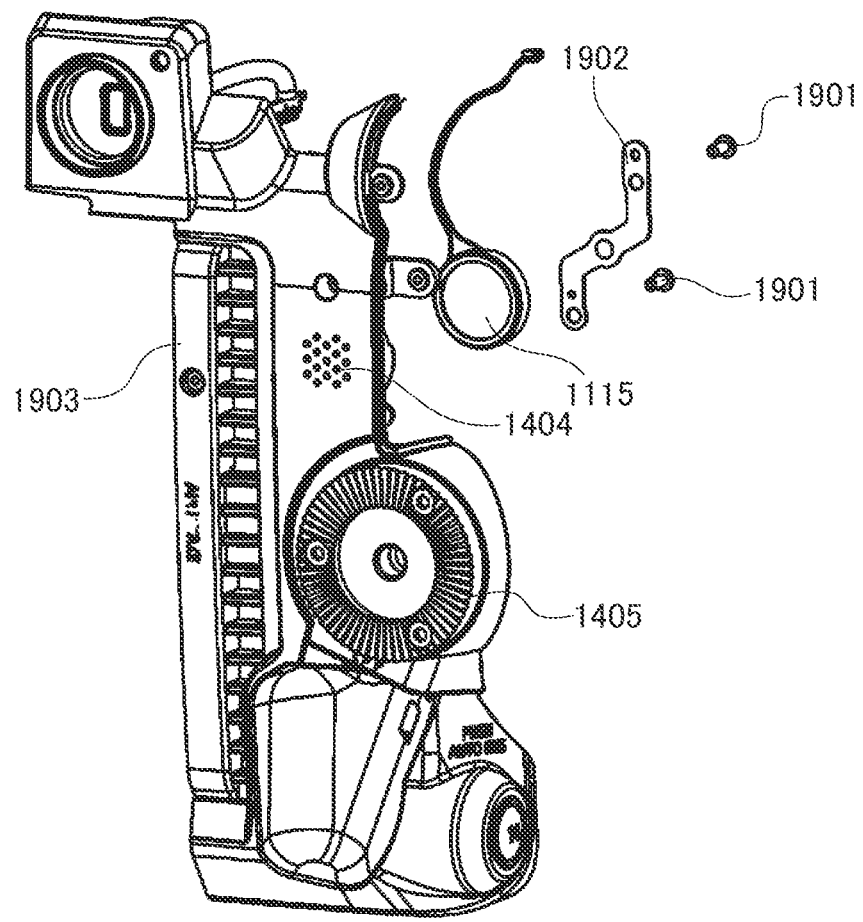
FIG. 13 is an exploded perspective view of members associated with speaker holes of the image capturing apparatus body.

FIG. 13 is an exploded perspective view of members associated with the speaker holes 1404 of the apparatus body 1001. The speaker 1115 is fixed between a speaker retaining sheet metal 1902 and an exterior cover 1903 with screws 1901. The speaker holes 1404 are provided in the vicinity of the attachment mechanism 1405 and are closely opposed to the speaker 1115.

Figure 14:
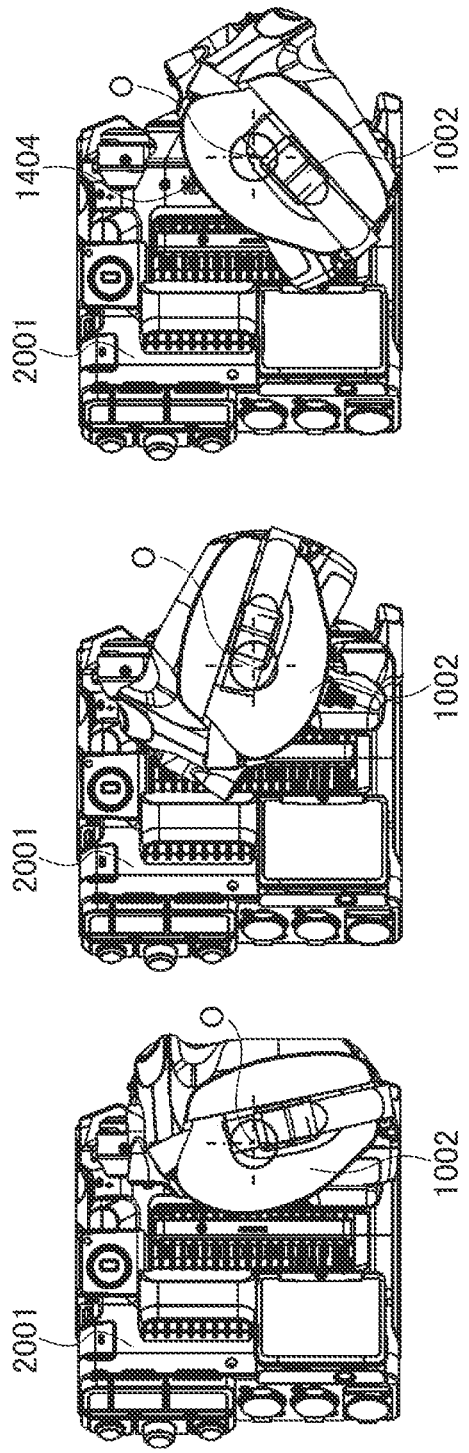
FIGS. 14A to 14C are left side views of the image capturing apparatus body in a state in which the grip unit is attached thereto.

FIGS. 14A to 14C are left side views of the apparatus body 1001 in a state in which the grip unit 1002 is attached thereto. The user can set a rotational phase of the grip unit 1002 about a rotation center O with respect to the apparatus body 1001 by appropriately selecting the engagement position between the attachment mechanism 1405 (see FIG. 6) and the grip-side engagement portion 1704 (see FIG. 12), as desired. In FIG. 14A, the grip unit 1002 is attached to the apparatus body 1001 in a normal position. In FIG. 14B, the grip unit 1002 is attached to the apparatus body 1001 in a state rotated from the normal position about the rotation center O through 30° in a counterclockwise direction as viewed from the left. In FIG. 14C, the grip unit 1002 is attached to the apparatus body 1001 in a state rotated from the normal position about the rotation center O through 30° in a clockwise direction as viewed from the left.

As viewed from the left side of the apparatus body 1001, the speaker holes 1404 are hidden by the grip unit 1002 in the states in FIGS. 14A and 14B, and are not hidden by the grip unit 1002 in the state in FIG. 14C. Thus, the speaker holes 1404 are often hidden by the grip unit 1002 as viewed from the side of the surface where the grip unit 1002 is arranged. That is, in an angle range through which the grip unit 1002 can be rotated, an angle range within which the speaker holes 1404 are hidden by the grip unit 1002 is wider than an angle range within which the speaker holes 1404 are not hidden by the grip unit 1002. Therefore, when a shooter grasps the grip unit 1002, the speaker holes 1404 are less often covered with a wrist or the like of the shooter.

Figure 15:
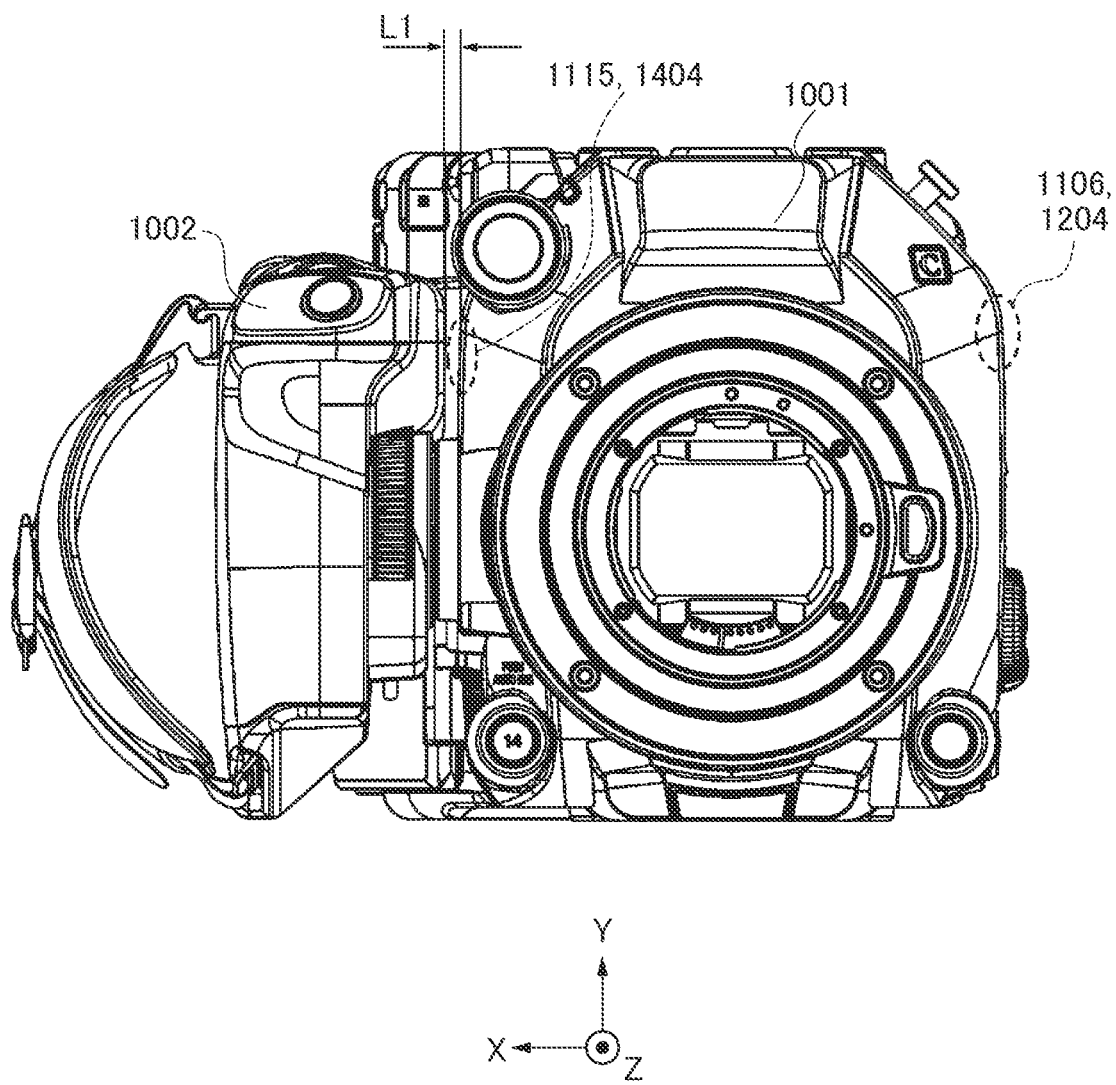
FIG. 15 is a front view of the image capturing apparatus body in a state in which the grip unit is in a normal position with respect thereto.

FIG. 15 is a front view of the apparatus body 1001 in a state in which the grip unit 1002 is in the normal position with respect to the apparatus body 1001 (see FIG. 14A). As shown in FIG. 15, a clearance L1 is secured between the speaker holes 1404 and the grip unit 1002 in the X direction. Further, spacing is never eliminated even when the grip unit 1002 is rotated to any position with respect to the apparatus body 1001 and at least the clearance L1 is secured over the whole range through which the grip unit 1002 can be rotated. This prevents sound output from the speaker holes 1404 from being shielded by the grip unit 1002, and the user can hold the apparatus body 1001 without blocking the speaker holes 1404. Further, the microphone 1106 and the speaker 1115 are arranged within the casing of the apparatus body 1001 at respective locations distant from each other in the X direction. Particularly, the microphone 1106 is arranged on a surface opposite to the surface where the speaker 1115 (and the speaker holes 1404) is/are arranged. This makes it possible to suppress howling from being caused by the microphone 1106 picking up sound output from the speaker 1115.

As described hereabove, by attaching the wireless unit 1004 to the apparatus body 1001, it is possible to add a predetermined function to the image capturing system 1000. As shown in FIG. 5, the accessory attachment portion 2203 is arranged on the left side of the apparatus body 1001. The accessory attachment portion 2203 includes not only the body-side connection terminal 1123, but also a body-side fastening portion 2001 (see FIGS. 8A, 8B, 17, and 20C). The body-side connection terminal 1123 is connected to the accessory-side connection terminal 1124 (see FIGS. 16B and 17) to supply power to and perform communication with the wireless unit 1004. The body-side fastening portion 2001 is fastened to an accessory-side fastening portion 2002 (see FIGS. 16A and 16B), described hereinafter, by screwing.

Figure 16A:
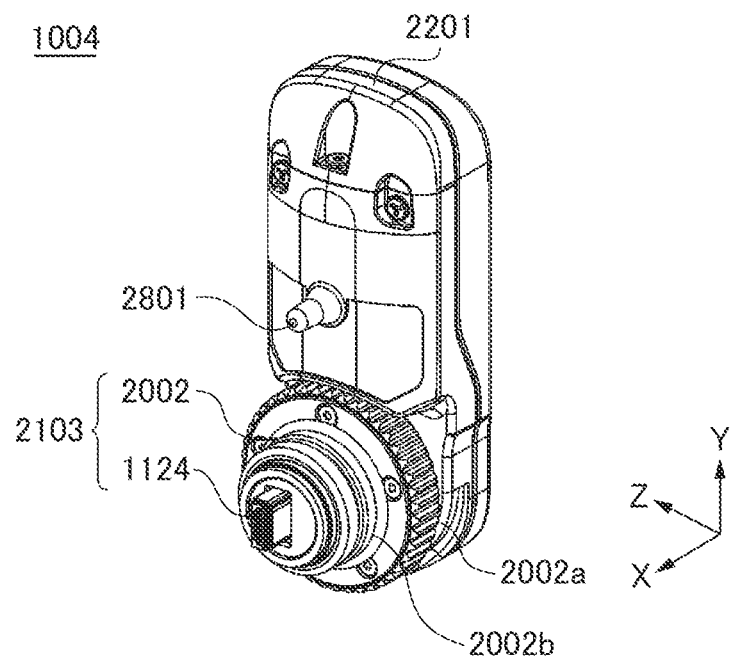
FIG. 16A is a perspective view of the wireless unit.
Figure 16B:
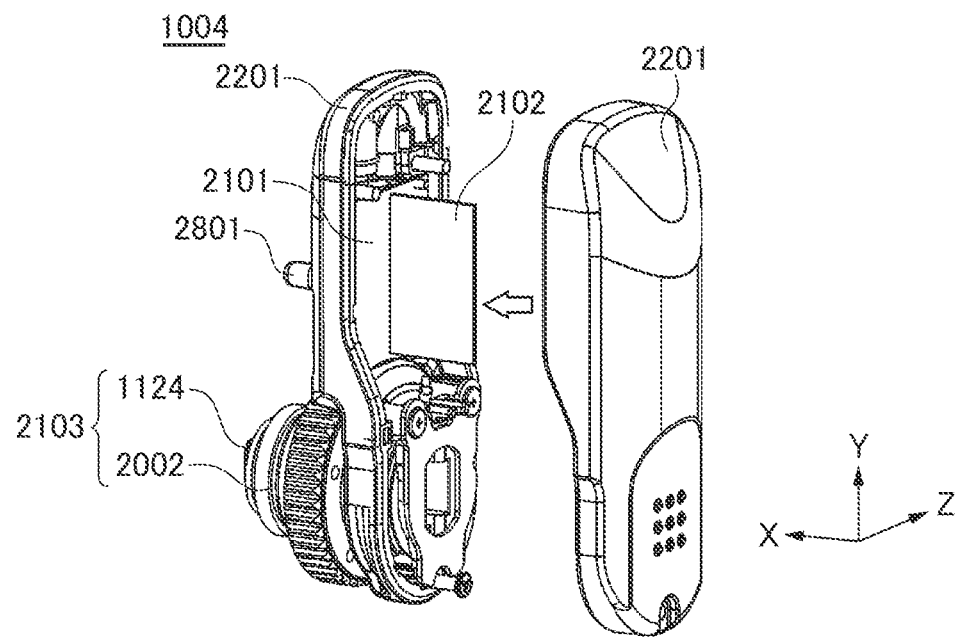
FIG. 16B is an exploded perspective view of the wireless unit.

FIGS. 16A and 16B are a perspective view and an exploded perspective view of the wireless unit 1004, respectively. When the wireless unit 1004 is attached to the apparatus body 1001, it is possible to operate, for example, the following functions: First, it is possible to transmit video data and audio data recorded in the image capturing system 1000 to an external device. Further, it is possible to transmit video data and audio data currently being shot and collected by the image capturing system 1000 to the external device. Further, it is possible to operate the shooting function, etc. of the image capturing system 1000 from the external device. Further, it is possible to change the settings of the shooting function, etc., of the image capturing system 1000 from the external device.

The wireless unit 1004 includes an accessory exterior 2201, an accessory-side circuit board 2101, an antenna portion 2102, an accessory-side attachment portion 2103, and a rotation stopper protrusion 2801 (protruding portion). The antenna portion 2102 is a component for transmitting and receiving wireless radio waves and is electrically connected to the accessory-side circuit board 2101. The antenna portion 2102 is connected to a side (+Y side) opposite to the accessory-side attachment portion 2103 in a longitudinal direction (Y direction). The accessory-side attachment portion 2103 is a portion via which the wireless unit 1004 is attached to the apparatus body 1001 and includes the accessory-side connection terminal 1124 and the accessory-side fastening portion 2002.

Note that the accessory which can be attached to the accessory attachment portion 2203 (see FIG. 5) is not limited to the wireless unit 1004. For example, a recording device, a display device, a grasping member, a GPS (Global Positioning System) signal receiver, an interface for relaying communication with another device, etc., may be attached.

Figure 17:
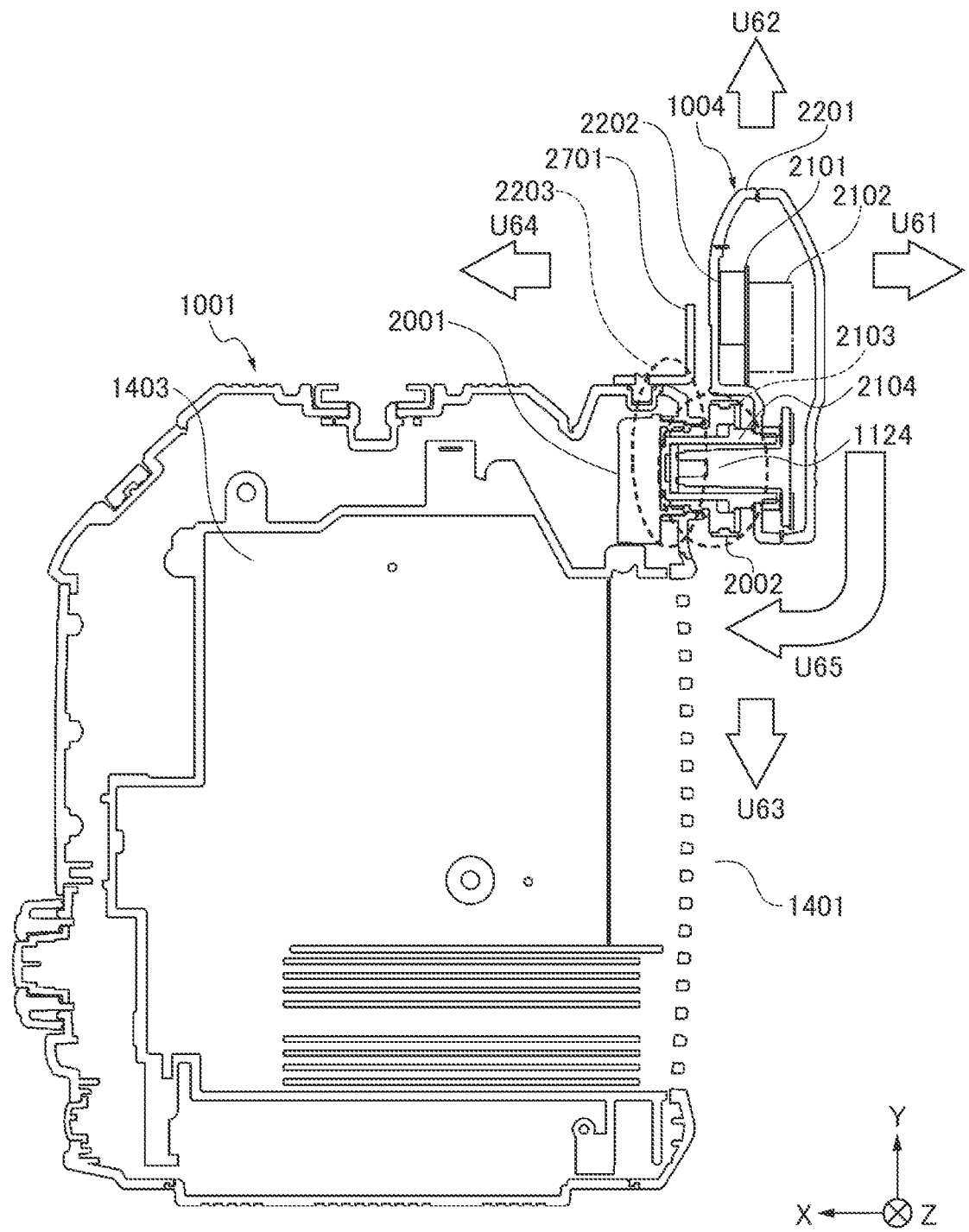
FIG. 17 is a cross-sectional view taken along line GA-GA in FIG. 7.

FIG. 17 is a cross-sectional view taken along line GA-GA in FIG. 7, which mainly shows structures of the wireless unit 1004 and the main duct 1403 in the apparatus body 1001. The accessory-side circuit board 2101 is a circuit board on which circuit components for operating the wireless unit 1004 are mounted, and, for example, modulates or demodulates wireless radio waves transmitted and received by the antenna portion 2102. The accessory-side circuit board 2101 generates heat in accordance with the operation of the wireless unit 1004 (in accordance with wireless communication).

The accessory-side connection terminal 1124 is held on the apparatus body 1001 by a terminal holding member 2104 (see FIG. 17). Further, the accessory-side connection terminal 1124 can receive electrical power supplied from the apparatus body 1001 and communicate with the apparatus body 1001 via the body-side connection terminal 1123 (see FIG. 5). The accessory-side fastening portion 2002 is a substantially ring-shaped member, and is mechanically connected to a tightening knob 2002a such that it can be rotated about an X axis using the tightening knob 2002a and be moved within a predetermined range in an X axis direction. An outer periphery of the accessory-side fastening portion 2002 is formed with a male screw 2002b and this male screw is screwed into the body-side fastening portion 2001 (see FIGS. 5 and 17).

The wireless unit 1004 is a wireless communication module, and hence communication characteristics of the wireless radio waves vary with a positional relationship between the apparatus body 1001 and the wireless unit 1004. To obtain good communication characteristics of the wireless radio waves, it is effective that there is no shielding object which readily absorbs wireless radio waves, around the antenna portion 2102, and therefore, it is preferable that the wireless unit 1004 is disposed at a location as distant as possible from the apparatus body 1001. In view of this, the positional relationship between the apparatus body 1001 and the wireless unit 1004, for obtaining good communication characteristics, will be described with reference to FIG. 17. Note that a method of attaching the wireless unit 1004 to the apparatus body 1001 will be described hereinafter.

The accessory attachment portion 2203 is disposed at a location close to the top surface of the apparatus body 1001 (location close to an exterior end in the +Y direction). The accessory-side attachment portion 2103 is disposed at a location close to the bottom surface of the wireless unit 1004 (location close to a lower end of the accessory exterior 2201 in the −Y direction). Therefore, in a state in which the wireless unit 1004 is attached to the apparatus body 1001, the apparatus body 1001 and an upper end of the wireless unit 1004 are located away from each other across the accessory-side attachment portion 2103. Further, the antenna portion 2102 (see FIG. 16B) in the wireless unit 1004 is provided such that it protrudes further toward the +Y side than the top surface (exterior end in the +Y direction) of the apparatus body 1001. Therefore, the antenna portion 2102 protrudes relative to the left side surface and the top surface of the apparatus body 1001, i.e. protrudes from the outside surface. With this, no shielding object that readily absorbs wireless radio waves exists not only in directions indicated by arrows U61, U62, and U63, but also in a direction indicated by an arrow U64, as viewed from the antenna portion 2102. This makes it possible to obtain good communication characteristics when the wireless unit 1004 performs wireless communication.

Further, the accessory attachment portion 2203 is provided at a location close to the top surface of the apparatus body 1001, and hence, even when the air inlet port 1401 and the accessory attachment portion 2203 are arranged side by side in the Y direction, it is possible to secure a wide opening area of the air inlet port 1401. With this, it is possible to reduce the size of the apparatus body 1001 in the optical axis direction (Z direction) without reducing the heat dissipation performance.

Here, the accessory attachment portion 2203 and the air inlet port 1401 are arranged on substantially the same plane. Further, in the state in which the wireless unit 1004 is attached to the apparatus body 1001, a longitudinal direction (Y direction) of the wireless unit 1004 and a longitudinal direction of the air inlet port 1401 are substantially parallel to each other, and substantially orthogonal to the optical axis direction. Further, in a state in which the wireless unit 1004 and the grip unit 1002 are attached to the apparatus body 1001, a predetermined space is formed between the wireless unit 1004 and the grip unit 1002.

As mentioned above, since the wireless unit 1004 generates heat in accordance with its operation, it is preferable that the wireless unit 1004 is cooled. In view of this, a structure for effectively cooling the wireless unit 1004 will be described.

The cooling structure in the present embodiment has two main features. The first feature is that heat is transferred from the accessory-side attachment portion 2103 of the wireless unit 1004 to the accessory attachment portion 2203 of the apparatus body 1001, and transfer heat to the main duct 1403 via the body-side fastening portion 2001. The second feature is that heat is dissipated by drawing air around the accessory exterior 2201 from the air inlet port 1401.

First, the first feature of the cooling structure will be described. As shown in FIG. 17, the accessory-side circuit board 2101 is connected to the accessory exterior 2201 via an accessory-side heat transfer member 2202. The accessory-side heat transfer member 2202 is formed of a material having high thermal conductivity, such as rubber. Further, the accessory exterior 2201 is connected to the terminal holding member 2104 surrounding the accessory-side connection terminal 1124. Also, the terminal holding member 2104 is connected to the accessory-side fastening portion 2002.

With these connection structures, heat generated in the wireless unit 1004 is sequentially transferred from the accessory-side circuit board 2101 to the accessory-side heat transfer member 2202, the accessory exterior 2201, the terminal holding member 2104, and the accessory-side fastening portion 2002. Further, as described hereinabove, the accessory-side fastening portion 2002 is screwed into the body-side fastening portion 2001, and hence heat transfer from the accessory-side fastening portion 2002 to the body-side fastening portion 2001 can be performed. Thus, heat is transferred from the wireless unit 1004 to the apparatus body 1001.

Figure 18A:
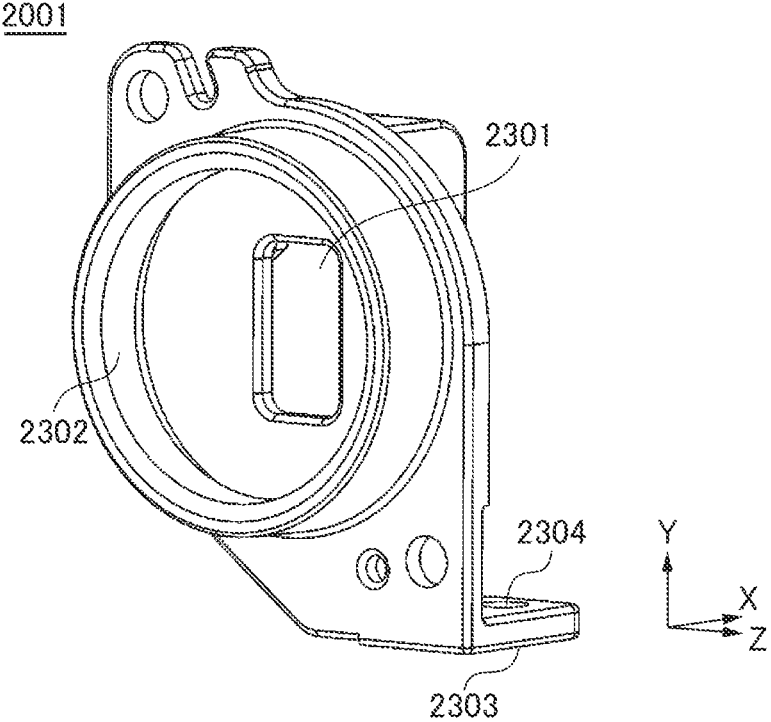
FIG. 18A is a perspective view of a body-side fastening portion, as viewed from outside the image capturing apparatus body.
Figure 18B:
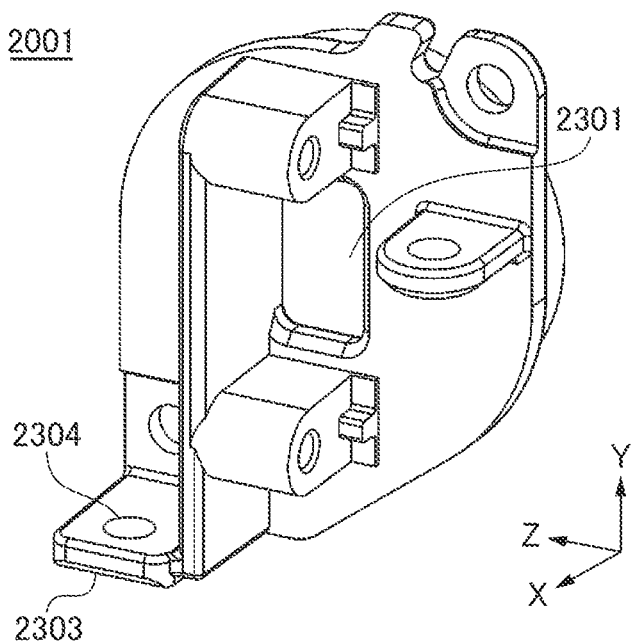
FIG. 18B is a perspective view of the body-side fastening portion, as viewed from inside the image capturing apparatus body.

FIGS. 18A and 18B are perspective views of the body-side fastening portion 2001, as viewed from the outside and the inside of the apparatus body 1001, respectively. The body-side fastening portion 2001 is formed of a metallic material having high thermal conductivity (such as aluminum and magnesium). The body-side connection terminal 1123 (see FIG. 5) is inserted through a connection terminal insertion hole 2301, thereby being held by the body-side fastening portion 2001.

A fastening member female screw portion 2302 is provided outward of the connection terminal insertion hole 2301. When the wireless unit 1004 is attached to the apparatus body 1001, the male screw 2002b formed on the outer periphery of the accessory-side fastening portion 2002 (see FIG. 16) is screwed into the fastening member female screw portion 2302. Since the fastening member female screw portion 2302 is formed outward of the periphery of the connection terminal insertion hole 2301, it is possible to secure a wide contact area between the fastening member female screw portion 2302 and the accessory-side fastening portion 2002. This makes it possible to effectively transfer heat from the accessory-side fastening portion 2002 to the fastening member female screw portion 2302.

The body-side fastening portion 2001 has a flat portion 2303. The flat portion 2303 is fastened to a flat portion, not shown, of the main duct 1403 (see FIG. 17) with a screw, not shown, inserted through a screw hole 2304, whereby the body-side fastening portion 2001 is fixed to the main duct 1403. The flat portion 2303 is in contact with the main duct 1403 (see FIG. 17) and transfers heat from the body-side fastening portion 2001. Since the flat portions are brought into contact with each other, it is possible to easily realize stable contact between the two surfaces, compared with e.g. contact between curved surfaces. That is, by fastening the flat portion 2303 to the main duct 1403, the flat portion 2303 is brought into surface contact with the main duct 1403. With this, it is possible to effectively transfer heat from the body-side fastening portion 2001 to the main duct 1403.

Further, as shown in FIGS. 8A, 8B, and 17, the body-side fastening portion 2001 is connected to the vicinity of the air inlet port 1401 of the main duct 1403. That is, the body-side fastening portion 2001 is connected to the main duct 1403 at a location closer to the air inlet port 1401 than the air outlet port 1402. Air passing through the main duct 1403 is cool when passing an area close to the air inlet port 1401 but is warmed as it passes through the main duct 1403. For this reason, by connecting the body-side fastening portion 2001 to the vicinity of the air inlet port 1401 of the main duct 1403, it is possible to obtain a higher heat dissipation effect.

As shown in FIGS. 8A and 8B, in a state in which the body-side fastening portion 2001 is fixed to the main duct 1403 with the screw inside the apparatus body 1001, heat is transferred from the body-side fastening portion 2001 to the main duct 1403. The heat transferred to the main duct 1403 is transferred to air passing through the main duct 1403 as mentioned above, and warmed air is discharged from the air outlet port 1402 after passing through the fan 1110, thereby performing heat dissipation.

Thus, since the body-side fastening portion 2001 connected to the wireless unit 1004 is connected to the main duct 1403 inside the apparatus body 1001, it is possible to effectively cool the wireless unit 1004. Note that it is preferable that the distance from the accessory-side circuit board 2101 of the wireless unit 1004 to the components connecting between the wireless unit 1004 and the main duct 1403 of the apparatus body 1001 is short. If this distance is short, a thermal transfer path from the wireless unit 1004 to the main duct 1403 is reduced, which makes it possible to effectively transfer heat.

Next, the second feature of the cooling structure will be described. First, in the wireless unit 1004, heat generated in the accessory-side circuit board 2101 is transferred to the accessory exterior 2201. The heat transferred to the accessory exterior 2201 is transferred to air surrounding the accessory exterior 2201. As shown in FIG. 17, in the state in which the wireless unit 1004 is attached, the accessory exterior 2201 is adjacent to the −X side of the air inlet port 1401 of the apparatus body 1001. Therefore, as indicated by an arrow U65 in FIG. 17, air around the accessory exterior 2201 is drawn into the air inlet port 1401, and an air flow toward the air inlet port 1401 is always generated around the accessory exterior 2201. Further, a direction of attaching the wireless unit 1004 and a direction in which air drawn into the air inlet port 1401 mainly flows are both the +X direction, and are substantially parallel to each other. With this, air around the accessory exterior 2201 is always replaced by cool air, and hence it is possible to effectively cool the wireless unit 1004.

Note that as shown in FIG. 7, the accessory attachment portion 2203 is disposed such that the distance between the wireless unit 1004 and the air inlet port 1401 is shorter than the distance between the wireless unit 1004 and the air outlet port 1402. That is, in the state in which the wireless unit 1004 is attached, the wireless unit 1004 is closer to the air inlet port 1401 than the air outlet port 1402. With this, cool wind surrounding the accessory exterior 2201 is effectively drawn into the air inlet port 1401, and on the other hand, it is possible to prevent warm wind discharged from the air outlet port 1402 from blowing against the accessory exterior 2201. Therefore, it is possible to enhance the cooling effect.

Further, let us consider a case where the image capturing system 1000 having the wireless unit 1004 attached thereto is used near a wall or ceiling, in other words, a case where a wall exists in the vicinity of a −X side exterior surface of the image capturing system 1000 or a case where a ceiling exists in the vicinity of a +Y side exterior surface of the same. In this case, as shown in FIGS. 7 and 17, since the wireless unit 1004 is disposed to extend farther outward of the exterior surface of the apparatus body 1001, spaces are necessarily generated between the left side surface (the −X side exterior surface) of the apparatus body 1001 and the wall, and between the top surface (the +Y side exterior surface) and the ceiling. This prevents the air inlet port 1401 and the air outlet port 1402 from being blocked by the wall or ceiling. Further, an air flow passage is formed through which air smoothly flows from the space above the top surface of the apparatus body 1001 toward the air inlet port 1401. Therefore, air is not blocked from being drawn into and discharged from the apparatus body 1001. With this, even in a case where the wireless unit 1004 is attached to the apparatus body 1001 and the amount of heat generated by the image capturing system 1000 as a whole increases, it is possible to effectively cool the wireless unit 1004 and the apparatus body 1001.

Thus, the body-side fastening portion 2001 is connected to the main duct 1403 and also the air inlet port 1401 is arranged to draw air around the accessory exterior 2201. With this configuration, it is possible to efficiently transfer heat generated in the wireless unit 1004 to the main duct 1403 to perform heat dissipation. This cooling structure is particularly suitable for cooling an accessory that is compact and generates a large amount of heat, such as the wireless unit 1004. Note that the body-side fastening portion 2001 is exposed to the outside in a state in which the wireless unit 1004 is not attached. Therefore, it is possible to easily connect the wireless unit 1004 to the duct with a simple attachment operation. On the other hand, when the wireless unit 1004 is attached, the body-side fastening portion 2001 is not exposed to the outside, which prevents degradation of the appearance quality.

Incidentally, to prevent noise of the fan 1110 from being recorded, the image capturing system 1000 has a control mode in which the fan 1110 is rotated when recoding is not performed and is stopped when recording is performed. When the fan 1110 is stopped, heat generated in the main processing circuit board 1105 and the wireless unit 1004 is absorbed by the heat capacity of the main duct 1403. However, the amount of heat generated in the wireless unit 1004 is small, compared with the main processing circuit board 1105. Therefore, if the wireless unit 1004 is too close to the main duct 1403, heat generated in the main processing circuit board 1105 is transferred to the wireless unit 1004 via the main duct 1403, and warms the wireless unit 1004.

That is, if the fan 1110 is rotated, heat is transferred from the wireless unit 1004 to the main duct 1403, but if the fan 1110 is stopped, heat is transferred in the opposite direction. To prevent this, as shown in FIG. 17, the wireless unit 1004 is arranged slightly away from the main duct 1403. That is, the distance between the wireless unit 1004 and the main duct 1403 (see FIG. 17) is made larger than the distance between the main processing circuit board 1105 and the main duct 1403 (see FIG. 9), whereby the transferability of heat to the wireless unit 1004 is slightly reduced. This makes it possible to suppress the opposite flow of heat when the fan is stopped.

In other words, the components related to the cooling structure are arranged with the following positional relationship: First, the main heat sources are the main processing circuit board 1105 (first heat source) provided in the apparatus body 1001 and the accessory-side circuit board 2101 (second heat source) provided in the wireless unit 1004. In the state in which the wireless unit 1004 is attached to the apparatus body 1001, the accessory-side circuit board 2101 is more distant from the main duct 1403 than the main processing circuit board 1105 is.

Incidentally, the main duct 1403 is an electrically conductive member having the largest volume in the apparatus body 1001 and also functions as a member at a reference potential (so-called ground potential) in the image capturing system 1000. Since the body-side fastening portion 2001 is connected to the main duct 1403, it is possible to stabilize the reference potential of the body-side fastening portion 2001 and the wireless unit 1004. This makes it possible to release external electrical noise, such as wireless radio waves received by the wireless unit 1004, to the main duct 1403, and thereby stably operate the wireless unit 1004.

Further, since the main processing circuit board 1105 is in contact with the main duct 1403, the main processing circuit board 1105 and the body-side fastening portion 2001 are arranged close to each other. This makes it possible to reduce the wiring length between the main processing circuit board 1105 and the body-side connection terminal 1123, and thereby make the wiring difficult to be influenced by external electrical noise, such as wireless radio waves, during electrical communication.

Figure 19:
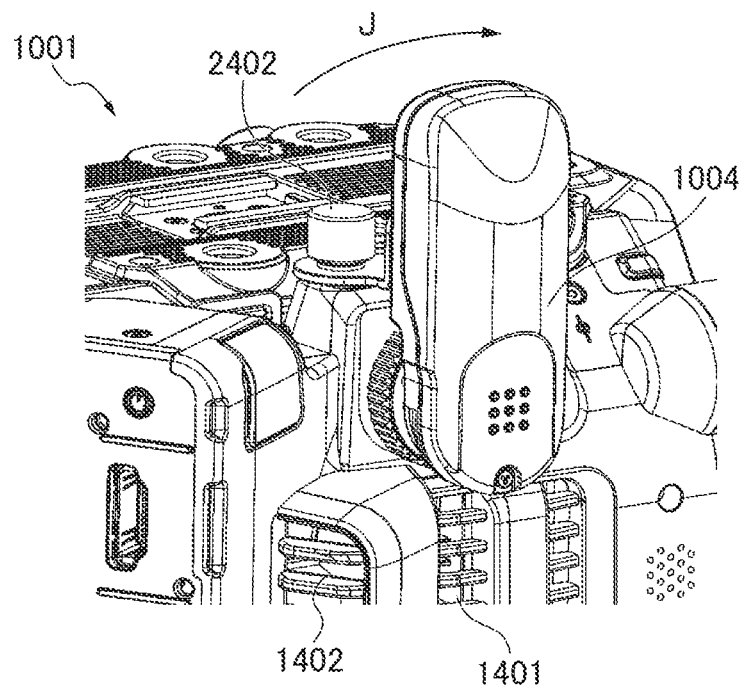
FIG. 19 is a partial perspective view of the image capturing apparatus body in a state in which the wireless unit is attached thereto.
Figure 20A:
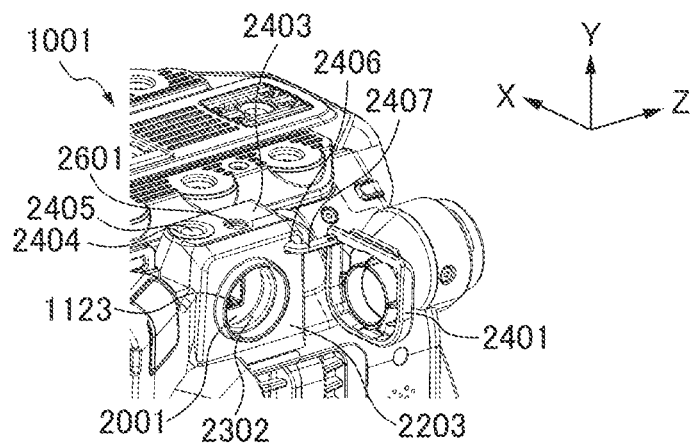
FIGS. 20A to 20C are perspective views of an accessory attachment portion and its surroundings.
Figure 20B:
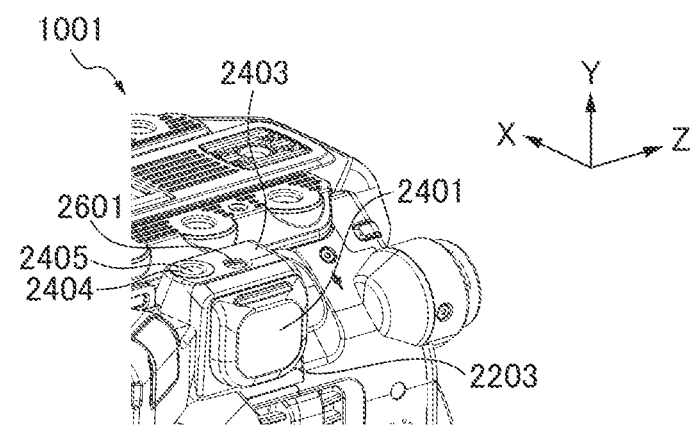
Figure 20C:
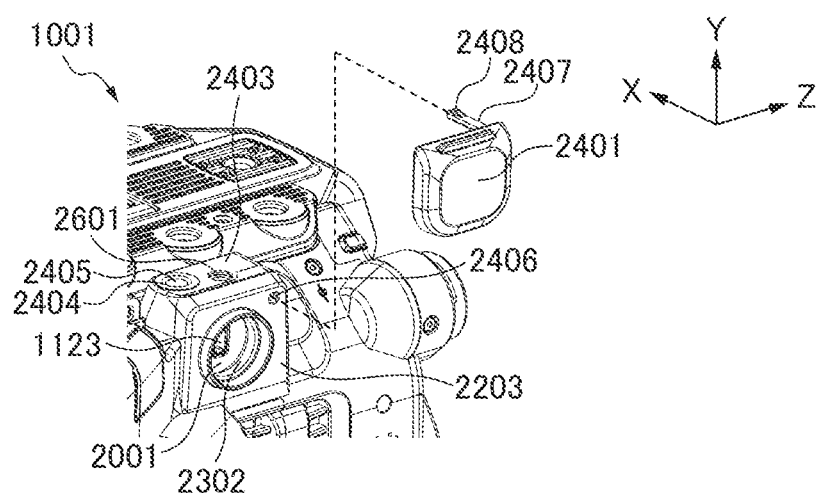

Next, a structure for preventing breakage of the body-side connection terminal 1123 will be described with reference to FIGS. 19, and 20A to 20C. FIG. 19 is a partial perspective view of the apparatus body 1001 in a state in which the wireless unit 1004 is attached thereto. FIGS. 20A to 20C are perspective views of the accessory attachment portion 2203 and its surroundings.

As shown in FIG. 20A, a protection cover 2401 as a cover member is provided on the accessory attachment portion 2203 such that it can be opened and closed and be attached to and removed from the accessory attachment portion 2203. The protection cover 2401 is in an open state in FIG. 20A, in a closed state in FIG. 20B, and in a removed state in FIG. 20C.

The wireless unit 1004 attached to the apparatus body 1001 is required to have good antenna characteristics. As shown in FIG. 19, in the state in which the wireless unit 1004 is attached to the apparatus body 1001, the wireless unit 1004 protrudes upward from the top surface of the apparatus body 1001. Since the wireless unit 1004 protrudes, there are few shielding objects around the wireless unit 1004. Therefore, the wireless unit 1004 can maintain a state in which it has good antenna characteristics.

However, if a force of rotating the wireless unit 1004 in a direction J (or in a direction opposite to the direction J) indicated in FIG. 19 is applied to an protruding tip end of the wireless unit 1004, a large rotational force is applied to the body-side connection terminal 1123 (see FIG. 20C) located in the vicinity of the root of the wireless unit 1004. If the applied force is too large, that the body-side connection terminal 1123 can be broken. Therefore, to prevent rotational displacement of the tip end of the wireless unit 1004, a rotation prevention member 2402 (see FIGS. 19, 24A, and 24B) is attached to the apparatus body 1001.

As shown in FIG. 20A, the accessory attachment portion 2203 where the wireless unit 1004 is attached is arranged in an upper portion of the left side of the apparatus body 1001. Further, a rotation prevention member attachment portion 2403 to which the rotation prevention member 2402 is attached is arranged adjacent to the accessory attachment portion 2203. The rotation prevention member attachment portion 2403 is arranged such that it forms a substantially right angle with the left side surface of the accessory attachment portion 2203.

The rotation prevention member attachment portion 2403 has a positioning hole 2601 formed therein as a circular non-through hole so as to position the rotation prevention member 2402 with respect to the apparatus body 1001 when fixing the rotation prevention member 2402. Further, the rotation prevention member attachment portion 2403 has a rotation prevention member-fastening hole 2404 formed therein as a fixing portion to which the rotation prevention member 2402 is fixed. Inside the rotation prevention member-fastening hole 2404, a female screw portion 2405 is formed, and the rotation prevention member 2402 can be firmly fixed to the rotation prevention member attachment portion 2403 by screwing.

The body-side connection terminal 1123 appearing in FIG. 20A, which is arranged on the accessory attachment portion 2203, is an electrical connection portion for electrically connecting the wireless unit 1004 thereto. Further, the accessory attachment portion 2203 has a protection cover insertion hole 2406 formed therein for attaching the protection cover 2401 thereto. In a state in which the wireless unit 1004 is not attached to the apparatus body 1001, it is possible to close the protection cover 2401 to cover the accessory attachment portion 2203, and thereby protect the body-side connection terminal 1123 (see FIG. 20B).

In a state in which the protection cover 2401 is open, the apparatus body 1001 and the protection cover 2401 are connected by a protection cover hinge portion 2407 via the protection cover insertion hole 2406. The protection cover insertion hole 2406 is a connection portion to which the protection cover 2401 is connected. The protection cover 2401 and the protection cover hinge portion 2407 are integrally formed of a member having elasticity. Therefore, as shown in FIG. 20A, the protection cover hinge portion 2407 can be freely bent. The protection cover 2401 and the protection cover hinge portion 2407 are molded of e.g. elastomer.

When a force is applied to the protection cover 2401 in a direction perpendicular to the accessory attachment portion 2203 (−X direction) from the state in which the protection cover 2401 is closed, the protection cover hinge portion 2407 can be removed from the protection cover insertion hole 2406 (see FIG. 20C). As shown in FIG. 20C, a tip end of the protection cover hinge portion 2407 is provided with a protection cover hinge engagement portion 2408. The protection cover hinge portion 2407 has a substantially circular cross-section, and the protection cover hinge engagement portion 2408 is formed such that it protrudes from the substantially circular shape. Therefore, the protection cover hinge engagement portion 2408 is engaged in the protection cover insertion hole 2406 in the state shown in FIG. 20A, and the protection cover hinge portion 2407 is prevented from being removed from the protection cover insertion hole 2406. However, the protection cover hinge engagement portion 2408 also has elasticity, and hence the protection cover hinge engagement portion 2408 is deformed by applying a predetermined force or larger, whereby the protection cover 2401 can be removed from the protection cover insertion hole 2406. Further, when the user applies a force to the protection cover 2401 from the state shown in FIG. 20C so as to cause the protection cover hinge engagement portion 2408 to be pushed into the protection cover insertion hole 2406, the protection cover hinge engagement portion 2408 is deformed and can be pushed into the protection cover insertion hole 2406. This cause the protection cover 2401 to return to the state shown in FIG. 20A. Thus, by attaching the rotation prevention member 2402 and the protection cover 2401, it is possible to prevent breakage of the body-side connection terminal 1123.

The apparatus body 1001 is required to be compact in size. To realize this, it is desirable that an area of a projected shadow of the accessory attachment portion 2203, in other words, an area of the surface of the accessory attachment portion 2203 in the upper portion of the left side of the apparatus body 1001 is also small. Next, size reduction of the accessory attachment portion 2203 will be described.

Figure 21A:
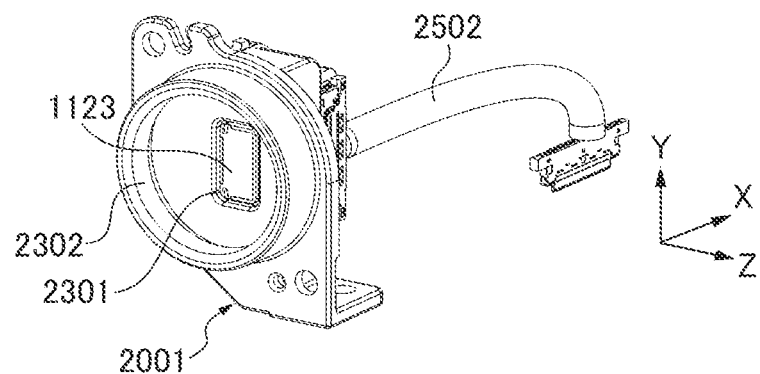
FIGS. 21A to 21C are perspective views of the body-side fastening portion and a body-side connection terminal.
Figure 21B:
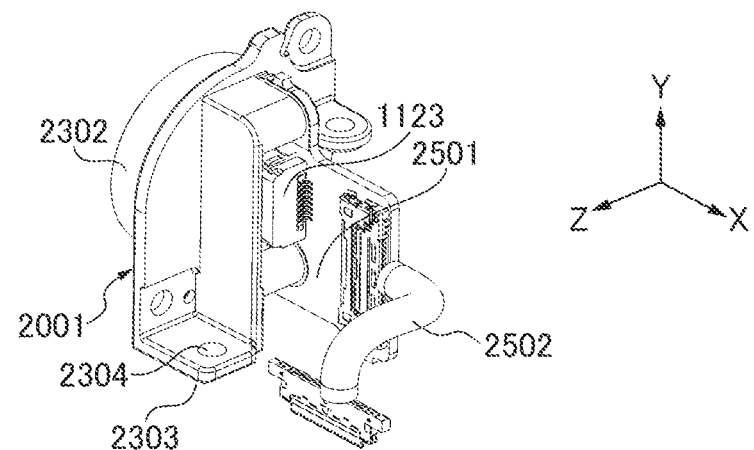
Figure 21C:
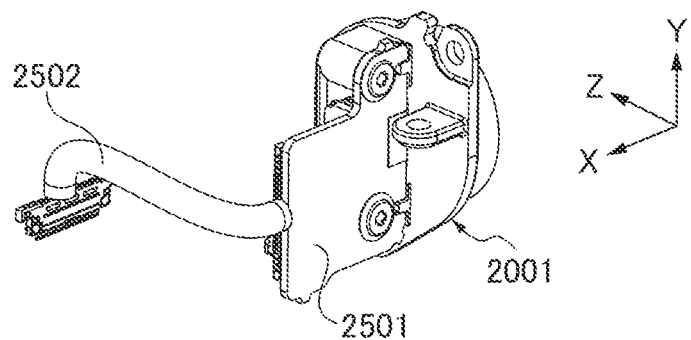
Figure 22:
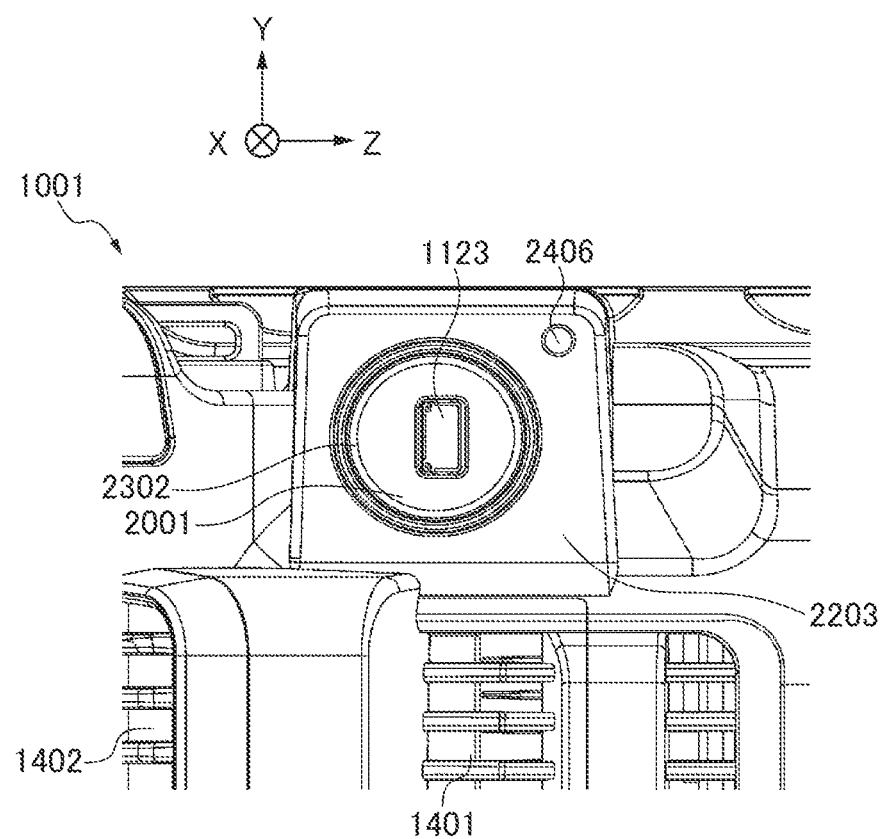
FIG. 22 is an enlarged view of the body-side connection terminal and its surroundings of the image capturing apparatus body.
Figure 23A:
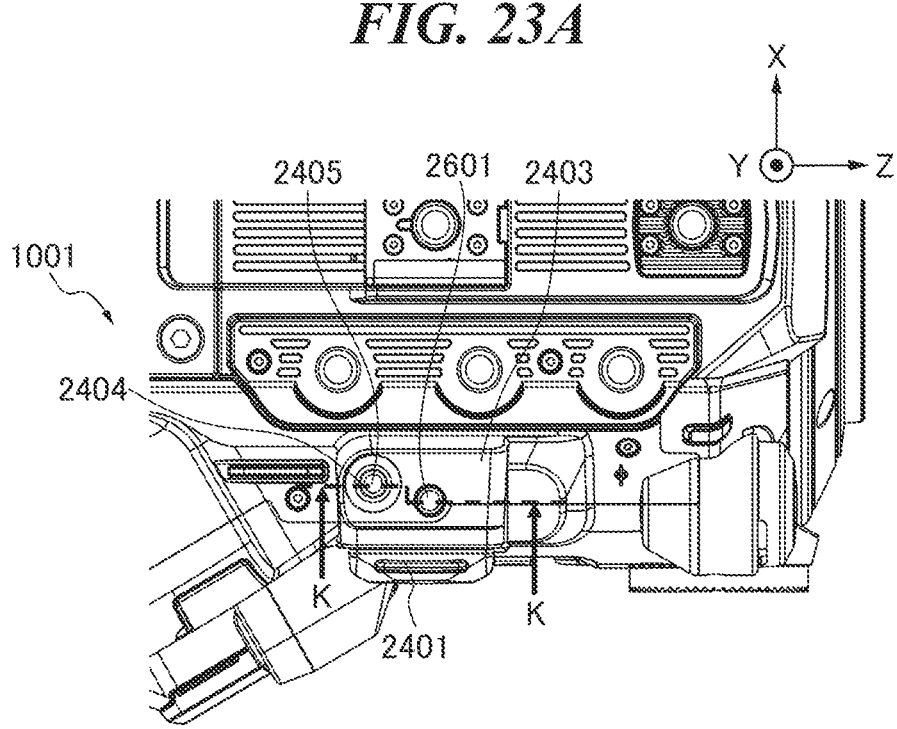
FIG. 23A is a top view of the surroundings of the body-side connection terminal.
Figure 23B:
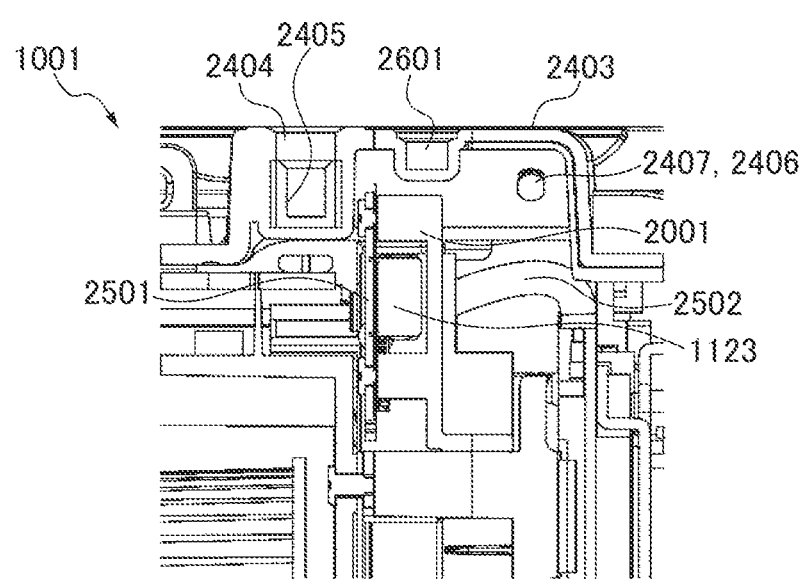
FIG. 23B is a cross-sectional view taken along line K-K in FIG. 23A.

FIGS. 21A to 21C are perspective views of the body-side fastening portion 2001 and the body-side connection terminal 1123. Particularly, FIGS. 21A, 21B, and 21C show the body-side fastening portion 2001 and the body-side connection terminal 1123, as viewed from the front left, the front right, and the rear right, respectively. FIG. 22 is an enlarged view of the body-side connection terminal 1123 and its surroundings of the apparatus body 1001. FIG. 23A is a top view of the body-side connection terminal 1123 and its surroundings. FIG. 23B is a cross-sectional view taken along line K-K in FIG. 23A.

First, the configuration of the body-side connection terminal 1123 will be described. As shown in FIG. 21B, the body-side connection terminal 1123 is mounted on a body-side connection terminal board 2501. The body-side connection terminal board 2501 is connected to the main processing circuit board 1105 (see FIG. 9) by body-side connection terminal wires 2502. The connection by the body-side connection terminal wires 2502 enables electrical signals to be sent from the main processing circuit board 1105 to the body-side connection terminal 1123. The body-side connection terminal board 2501 on which the body-side connection terminal 1123 is mounted is screwed and fixed to the body-side fastening portion 2001. The accessory-side fastening portion 2002 (see FIG. 16A) is screwed into the fastening member female screw portion 2302 (see FIG. 21A), whereby the apparatus body 1001 and the wireless unit 1004 are firmly fixed to each other.

Next, a positional relationship between the body-side connection terminal 1123, the positioning hole 2601, and the rotation prevention member-fastening hole 2404, appearing in FIGS. 20A to 20C, and 23A and 23B, will be described. First, the body-side connection terminal 1123 is provided in the left side surface (first surface) which is a −X side surface of the apparatus body 1001 (see FIG. 22). On the other hand, the positioning hole 2601 is arranged in the top surface (second surface) which is a +Y side surface of the apparatus body 1001 and is adjacent to the left side surface of the apparatus body 1001 such that is forms a substantially right angle therewith (see FIG. 23A). As shown in FIG. 23B, the positioning hole 2601 is formed at a location where it overlaps a projected shadow of the body-side connection terminal 1123 which is an electrical connection portion, as viewed from the +Y side. The positioning hole 2601 is a positioning portion for positioning the rotation prevention member 2402 (see FIG. 24A) with respect to the rotation prevention member attachment portion 2403. Therefore, the length of the hole of the positioning hole 2601 in the axial direction may be short. Therefore, even when the positioning hole 2601 is arranged at a location upward of the body-side connection terminal 1123 where it overlaps the projected shadow of the body-side connection terminal 1123, the area of the projected shadow of the accessory attachment portion 2203 does not become too large.

On the other hand, the rotation prevention member-fastening hole 2404 is a portion where the rotation prevention member 2402 is firmly fixed by screwing. In other words, the rotation prevention member 2402 is a support for holding the wireless unit 1004 and preventing rotational displacement of the tip end of the wireless unit 1004, and the rotation prevention member-fastening hole 2404 is a fixing portion to which this support is fixed. Therefore, when screwing and fixing the rotation prevention member 2402, the female screw portion 2405 of the rotation prevention member-fastening hole 2404 is required to resist the fastening force. To this end, it is necessary to make the female screw portion 2405 longer in the axial direction to thereby increase the screw engagement allowance. To secure a space for this, the rotation prevention member-fastening hole 2404 and the female screw portion 2405 are arranged at respective locations upward of the body-side connection terminal 1123 whereby the do not overlap the projected shadow of the body-side connection terminal 1123. In other words, the rotation prevention member-fastening hole 2404 is formed at a location where it does not overlap the projected shadow of the body-side connection terminal 1123 which is an electrical connection portion, as view from the +Y side.

As shown in FIGS. 22, 23A, and 23B, the protection cover insertion hole 2406 is located on an opposite side of the body-side connection terminal 1123 to the rotation prevention member-fastening hole 2404. That is, the protection cover insertion hole 2406 is provided on the side opposite to the rotation prevention member-fastening hole 2404, which is the fixing portion, with the body-side connection terminal 1123, which is the electrical connection portion, provided therebetween. Particularly, since the body-side fastening portion 2001 is formed with the fastening member female screw portion 2302, which has a circular shape, the protection cover insertion hole 2406 is formed obliquely upward (+Z side and +Y side) with respect to the body-side connection terminal 1123. With this arrangement, it is possible to make the area of the projected shadow of the accessory attachment portion 2203 small.

Since the protection cover hinge portion 2407 is formed by a member molded of e.g. elastomer, there is a possibility that the protection cover hinge portion 2407 is inserted in the protection cover insertion hole 2406 in a bent state. To prevent the protection cover hinge portion 2407 from interfering with the internal structure even when inserted in the bent state, it is necessary to provide space inward of the protection cover insertion hole 2406 as shown in FIG. 23B. For this reason, the protection cover insertion hole 2406 is arranged on the opposite side of the body-side connection terminal 1123 to the rotation prevention member-fastening hole 2404. This makes it possible to avoid interference between the internal structure and the protection cover hinge portion 2407 with a margin.

As described above, it is possible to make the area of the projected shadow of the accessory attachment portion 2203 small in the apparatus body 1001. By making the area of the projected shadow of the accessory attachment portion 2203 small, it is possible to secure a wide area for the air inlet port 1401, which contributes to improvement of cooling performance.

Figure 24A:
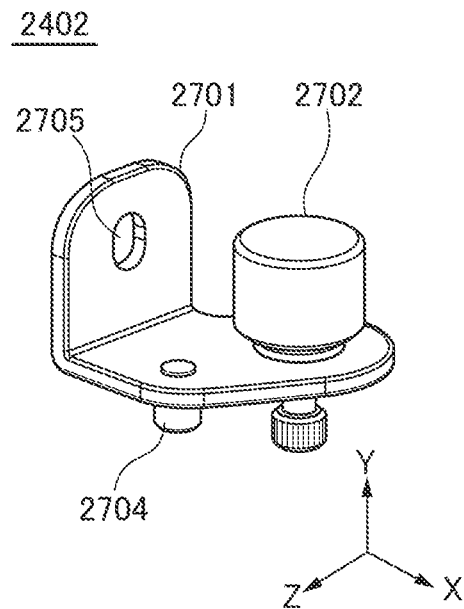
FIG. 24A is a perspective view of a rotation prevention member.
Figure 24B:
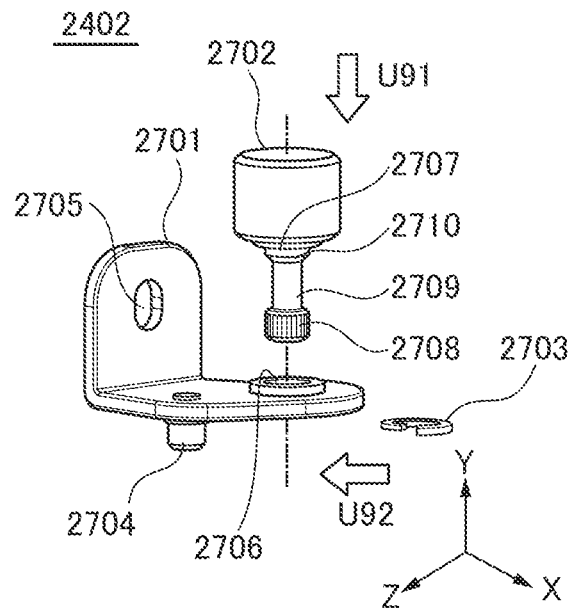
FIG. 24B is an exploded perspective view of the rotation prevention member.
Figure 24C:
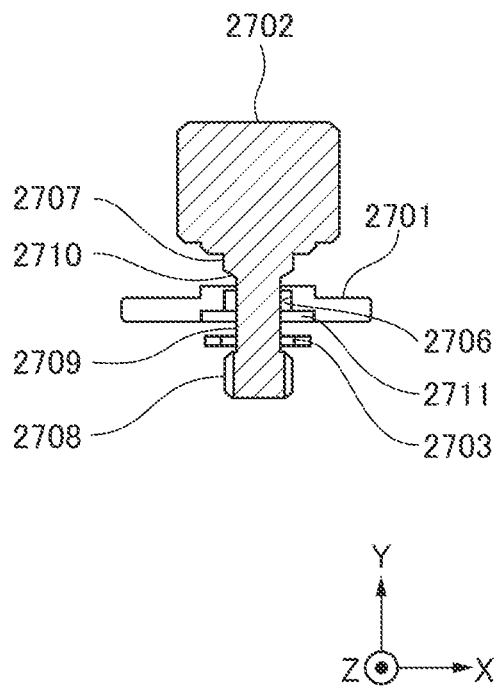
FIGS. 24C and 24D are schematic cross-sectional views of a manual fastening screw and its surroundings.
Figure 24D:
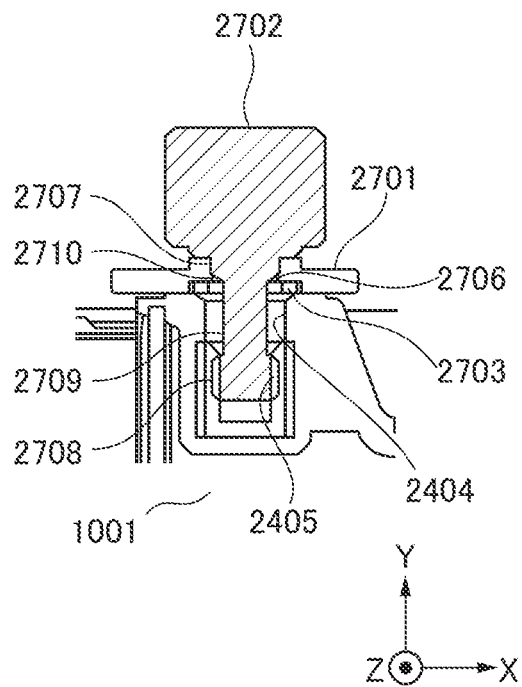

FIGS. 24A and 24B are a perspective view and an exploded perspective view of the rotation prevention member 2402, respectively. FIGS. 24C and 24D are schematic cross-sectional views of a manual fastening screw 2702 and its surroundings.

The rotation prevention member 2402 is comprised of a protrusion holding member 2701, the manual fastening screw 2702, and a retaining member 2703. The protrusion holding member 2701 has a positioning pin 2704, a protrusion holding hole 2705, and a rotation stopper hole 2706 (insertion hole). Particularly, the positioning pin 2704 and the rotation stopper hole 2706 are provided on a base (plate-shaped portion parallel to an X-Z plane) of the protrusion holding member 2701. The rotation stopper hole 2706 is e.g. a hole (slotted hole) having a substantially elliptical shape and a longitudinal direction of the substantially elliptical shape is substantially parallel to a line connecting between the center of the rotation stopper hole 2706 and the center of the positioning pin 2704.

The rotation stopper hole 2706 is a portion in which a large diameter portion 2707, described hereinafter, of the manual fastening screw 2702 is fitted. The positioning pin 2704 is a cylindrical protruding portion protruding from the base of the protrusion holding member 2701 in the −Y direction. The positioning pin 2704 has a diameter slightly smaller than the diameter of the positioning hole 2601 of the apparatus body 1001 and can be fitted in the positioning hole 2601 (see FIG. 23A) without looseness.

The manual fastening screw 2702 has a tip end male screw portion 2708, a small diameter portion 2709, a tapered portion 2710, and the large diameter portion 2707, continuously formed from the tip end side in the mentioned order (see FIG. 24C). In a shaft portion on a tip end side of the tapered portion 2710, the small diameter portion 2709 is a thin shaft portion which is smaller in diameter than the large diameter portion 2707. The tip end male screw portion 2708 is screwed into the female screw portion 2405 (see FIG. 23A) of the rotation prevention member-fastening hole 2404. The diameters of the tip end male screw portion 2708, the small diameter portion 2709, and the tapered portion 2710 are smaller than the diameter (width of the slotted hole) of the rotation stopper hole 2706 of the protrusion holding member 2701. Further, the large diameter portion 2707 has a diameter equal to or slightly larger than the diameter (width of the slotted hole) of the rotation stopper hole 2706, and can be fitted in the rotation stopper hole 2706 without looseness. Note that the small diameter portion 2709 and the large diameter portion 2707 are smoothly continuous with each other via the tapered portion 2710. That is, the small diameter portion 2709 and the large diameter portion 2707 are connected by the tapered portion 2710 having a smoothly changing shaft diameter. The retaining member 2703 is e.g. an E ring, and can be fitted on the small diameter portion 2709 of the manual fastening screw 2702.

To assemble the rotation prevention member 2402, as shown in FIG. 24B, an operator inserts the manual fastening screw 2702 in a direction indicated by an arrow U91, and then moves the retaining member 2703 in a direction indicated by an arrow U92 to fit the retaining member 2703 on the small diameter portion 2709, thus placing the rotation prevention member 2402 in an assembled state. By attaching the retaining member 2703, it is possible to prevent the manual fastening screw 2702 from dropping off from the protrusion holding member 2701.

The tip end male screw portion 2708 of the manual fastening screw 2702 is screwed through the rotation stopper hole 2706 into the female screw portion 2405 of the rotation prevention member-fastening hole 2404 of the rotation prevention member attachment portion 2403 of the apparatus body 1001, and the large diameter portion 2707 is fitted in the rotation stopper hole 2706, whereby the protrusion holding member 2701 is fastened to the apparatus body 1001. That is, the manual fastening screw 2702 is a fastening member for fastening the protrusion holding member 2701 to the apparatus body 1001. Further, the protrusion holding member 2701 holds the rotation stopper protrusion 2801 of the wireless unit 1004 via the protrusion holding hole 2705 having an elliptical shape. With this, it is possible to fix the wireless unit 1004 without looseness by a simple operation such that it is prevented from be unintentionally rotated.

Incidentally, when the rotation prevention member 2402 is attached to the apparatus body 1001, the shaft portion of the manual fastening screw 2702 functions as a rotation stopper such that the rotation prevention member 2402 is prevented from becoming loose. A structure for preventing looseness when the rotation prevention member 2402 is attached to the apparatus body 1001 will be described with reference to FIGS. 25A to 25D.

Figure 25A:
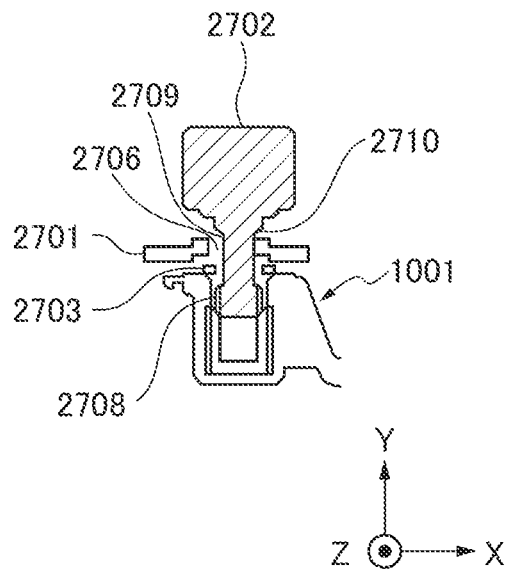
FIGS. 25A and 25B are schematic cross-sectional views of the manual fastening screw and its surroundings.
Figure 25B:
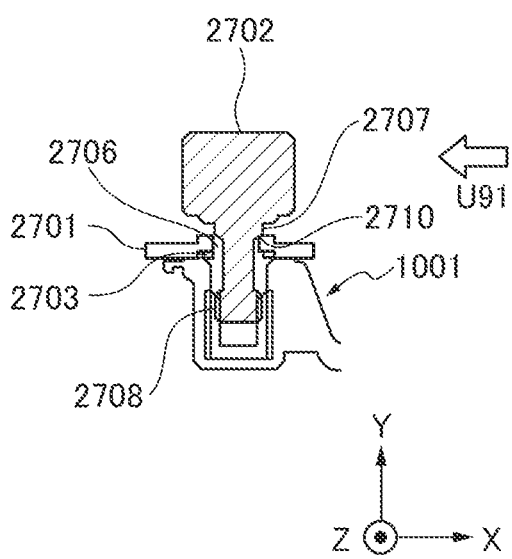
Figure 25C:
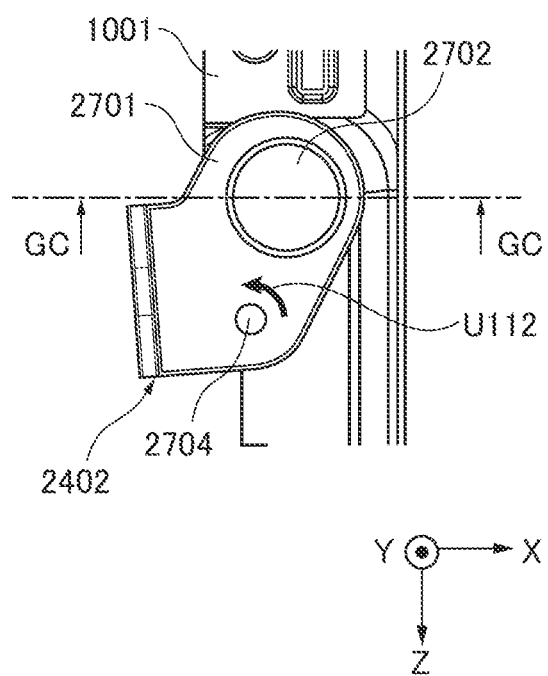
FIGS. 25C and 25D are views of the rotation prevention member, as viewed from the Y direction.
Figure 25D:
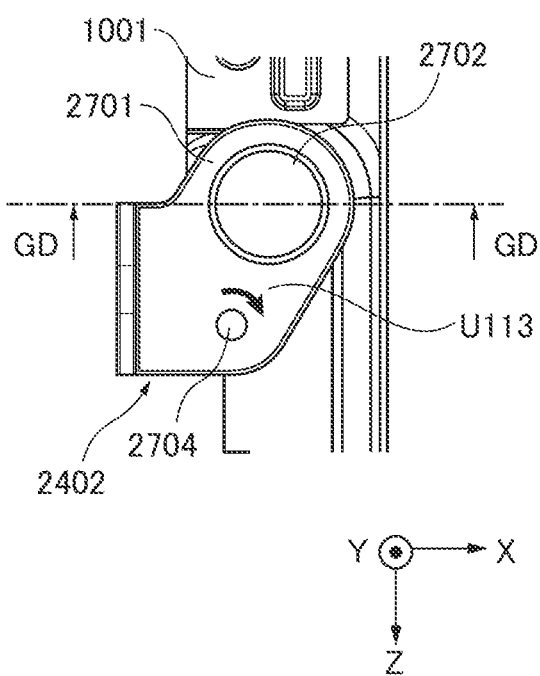

FIGS. 25A and 25B are schematic cross-sectional views of the manual fastening screw 2702 and its surroundings. FIGS. 25C and 25D are views of the rotation prevention member 2402, as viewed from the +Y side. Note that FIGS. 25A and 25B are cross-sectional views taken along line GC-GC in FIG. 25C, and line GD-GD in FIG. 25D, respectively. Particularly, FIGS. 25A and 25C show a state in which the center of the manual fastening screw 2702 and the center of the rotation stopper hole 2706 of the protrusion holding member 2701 are displaced from each other. Further, FIGS. 25B and 25D show a state in which the center of the manual fastening screw 2702 and the center of the rotation stopper hole 2706 are aligned.

In the state shown in FIGS. 25A and 25C, the protrusion holding member 2701 is rotationally displaced about the positioning pin 2704 in a direction indicated by an arrow U112 relative to the manual fastening screw 2702, and the centers of the rotation stopper hole 2706 and the manual fastening screw 2702 are displaced from each other. Further, the center of the retaining member 2703 is also displaced from the center of the rotation stopper hole 2706. When the manual fastening screw 2702 is screwed from this state, the manual fastening screw 2702 is moved in the −Y direction and the tapered portion 2710 is soon brought into contact with the rotation stopper hole 2706. Then, as the manual fastening screw 2702 is further screwed, the rotation stopper hole 2706 is guided by engagement between the tapered portion 2710 and the rotation stopper hole 2706. As a result, the protrusion holding member 2701 is rotationally displaced about the positioning pin 2704 in a direction indicated by an arrow U113 relative to the manual fastening screw 2702 (see FIG. 25D). At this time, the rotation stopper hole 2706 moves its position in a manner sliding along the tapered portion 2710. Therefore, as the tip end male screw portion 2708 is screwed into the female screw portion 2405, the centers of the rotation stopper hole 2706 and the manual fastening screw 2702 are eventually aligned. Therefore, the large diameter portion 2707 is fitted in the rotation stopper hole 2706 in a state in which the center of the manual fastening screw 2702 coincides with the center of the rotation stopper hole 2706.

Here, since the rotation stopper hole 2706 has the elliptical shape, and the width of the elliptical shape is equal to or slightly smaller than the diameter of the large diameter portion 2707, the manual fastening screw 2702 can function as the rotation stopper of the protrusion holding member 2701 about the positioning pin 2704. This makes it possible to fit the protrusion holding member 2701 and the manual fastening screw 2702 to each other without looseness. After that, when the manual fastening screw 2702 is further screwed, the tip end male screw portion 2708 of the manual fastening screw 2702 is firmly screwed into the female screw portion 2405 of the apparatus body 1001, whereby the protrusion holding member 2701 is fixed.

Thus, the action of the tapered portion 2710 makes it possible to avoid the manual fastening screw 2702 from being fastened in a state in which the centers of the rotation stopper hole 2706 and the manual fastening screw 2702 are displaced from each other. Therefore, for example, the manual fastening screw 2702 is prevented from being fastened in a state in which the protrusion holding member 2701 slides onto the retaining member 2703.

Further, since the large diameter portion 2707 of the manual fastening screw 2702 is fitted in the rotation stopper hole 2706 of the protrusion holding member 2701 without looseness, it is possible to attach the rotation prevention member 2402 to the apparatus body 1001 without looseness. This makes it possible to cause the manual fastening screw 2702 to also function as a rotation stopper of the protrusion holding member 2701 on an X-Z plane. Therefore, the protrusion holding member 2701 is prevented from being loosened without additionally providing a rotation stopper pin on the X-Z plane, and hence it is possible to reduce the number of components and cost.

Incidentally, as shown in FIG. 24C, the protrusion holding member 2701 is formed with a recessed portion 2711 around the rotation stopper hole 2706 on a side opposed to the apparatus body 1001. When the tip end male screw portion 2708 of the manual fastening screw 2702 is screwed into the female screw portion 2405 of the apparatus body 1001, the retaining member 2703 is received into the recessed portion 2711. This makes the apparatus body 1001 compact in size in the Z direction.

As mentioned above, in a case where a rotational force is unintentionally applied to the accessory-side connection terminal 1124 (see FIGS. 16A and 16B), it is necessary to avoid breakage of the accessory-side connection terminal 1124 and the body-side connection terminal 1123. This is particularly important when the user attaches the wireless unit 1004 to the apparatus body 1001. For this reason, when the user attaches the wireless unit 1004 to the apparatus body 1001, it is desirable that the user attaches the wireless unit 1004 in a state in which the rotation prevention member 2402 has been attached to the apparatus body 1001 in advance. A mechanism contrived, in view of this, for causing a user to attach the rotation prevention member 2402 and the wireless unit 1004 to the apparatus body 1001 in a correct procedure will be described with reference to FIGS. 26A to 26C.

Figure 26A:
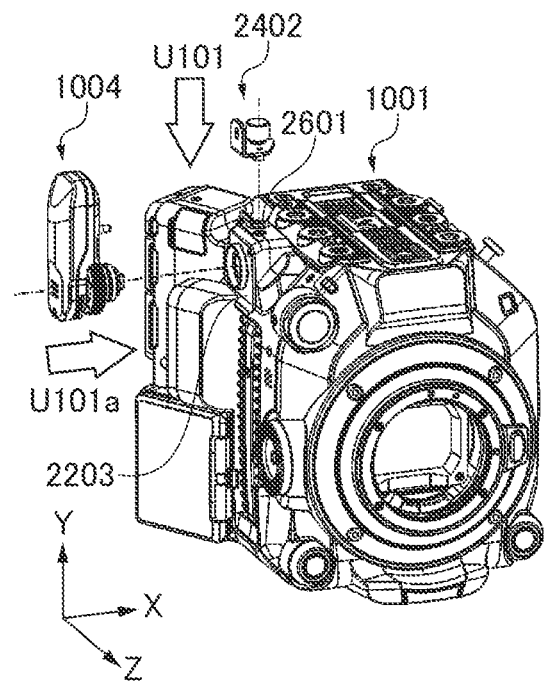
FIGS. 26A to 26C are views showing steps of attaching the rotation prevention member and the wireless unit to the image capturing apparatus body.
Figure 26B:
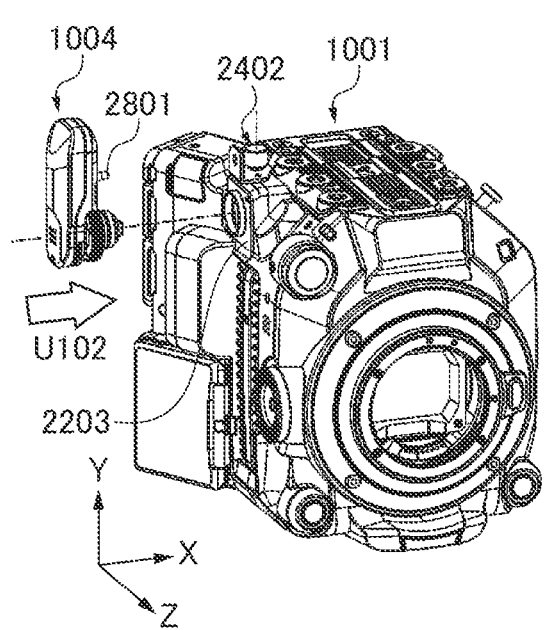
Figure 26C:
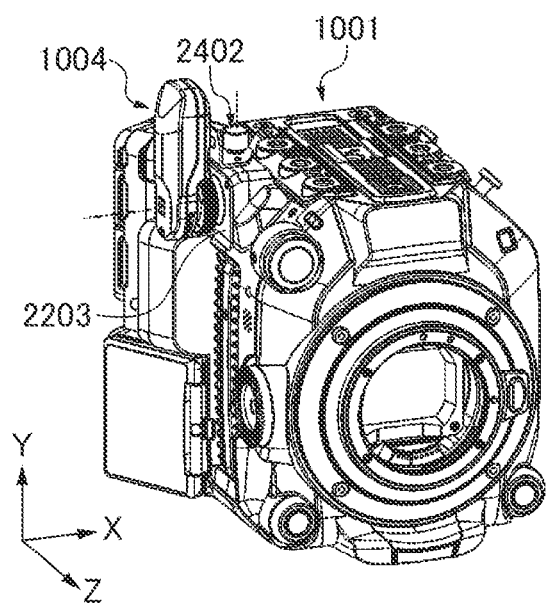

FIGS. 26A to 26C are transition views showing a process for attaching the rotation prevention member 2402 and the wireless unit 1004 to the apparatus body 1001.

In a case where an attachment operation is performed according to the correct procedure, first, the user attaches the rotation prevention member 2402 to the apparatus body 1001. More specifically, the user fits the positioning pin 2704 (see FIG. 24A) of the protrusion holding member 2701 of the rotation prevention member 2402 in the positioning hole 2601 of the apparatus body 1001 in a direction indicated by an arrow U101 (from the +Y side) in FIG. 26A. Then, the user rotates the manual fastening screw 2702 to screw the tip end male screw portion 2708 into the rotation prevention member-fastening hole 2404 of the apparatus body 1001 (see FIG. 24D). As a result, as shown in FIG. 26B, the rotation prevention member 2402 has been attached to the apparatus body 1001, but the wireless unit 1004 has not been attached yet.

Next, the user attaches the wireless unit 1004 to the apparatus body 1001. More specifically, the user brings the wireless unit 1004 into abutment with the accessory attachment portion 2203 in a direction indicated by an arrow U102 in FIG. 26B (from the −X side) and causes the accessory-side fastening portion 2002 (see FIG. 16A) to rotate in the direction J (see FIG. 19) using the tightening knob 200a. This causes the accessory-side fastening portion 2002 to be screwed into the fastening member female screw portion 2302 (see FIG. 21A) of the body-side fastening portion 2001. Concurrently, the rotation stopper protrusion 2801 (see FIG. 16A) of the wireless unit 1004 is fitted into the protrusion holding hole 2705 (see FIG. 24A) of the rotation prevention member 2402, whereby the rotation stopper protrusion 2801 is restricted from moving in the Z direction. With this, as shown in FIG. 26C, the rotation prevention member 2402 and the wireless unit 1004 are placed in a state properly attached to the apparatus body 1001.

On the other hand, if the rotation prevention member 2402 and the wireless unit 1004 are attached in a wrong procedure, the following problem is caused: First, let it be assumed that the user moves the wireless unit 1004 in a direction indicated by an arrow U101a in FIG. 26A, and attaches the wireless unit 1004 first without attaching the rotation prevention member 2402. The protrusion holding hole 2705 of the protrusion holding member 2701 has a closed elliptical shape. Therefore, if the wireless unit 1004 is attached to the apparatus body 1001 first, even when the user attempts to attach the rotation prevention member 2402 after that, the rotation stopper protrusion 2801 interferes with the protrusion holding member 2701 of the rotation prevention member 2402. Therefore, the rotation prevention member 2402 cannot be attached to the apparatus body 1001. In short, in the state in which the wireless unit 1004 has been attached to the apparatus body 1001 first, the rotation prevention member 2402 is interfered with the rotation stopper protrusion 2801 and cannot be fastened to the apparatus body 1001.

Assuming that the user attempts to attach the wireless unit 1004 to the apparatus body 1001 in a state in which the rotation prevention member 2402 is not attached, the user can then notice that the rotation prevention member 2402 cannot be attached to the apparatus body 1001. This provides an effect of prompting the user to attach the rotation prevention member 2402 to the apparatus body 1001 in advance when attaching the wireless unit 1004 to the apparatus body 1001.

The rotation prevention member 2402 holds the upper part of the wireless unit 1004, as described above, when a rotational force is applied to the accessory exterior 2201, it is possible to prevent the wireless unit 1004 from being rotated to break the accessory-side connection terminal 1124. For example, when a finger or another object touches the accessory exterior 2201 or the accessory-side fastening portion 2002 is rotated in order to attach the wireless unit 1004 to the apparatus body 1001, it is possible to prevent the wireless unit 1004 from being unintentionally rotated.

Next, the arrangement of an angular speed sensor, an acceleration sensor, and a geomagnetic sensor, for making vibrations and magnetic noise generated in the apparatus body 1001 difficult to propagate will be described. For clear indication of vibration sources and magnetic noise sources, the configuration of each cover unit will be described again.

Figure 27:
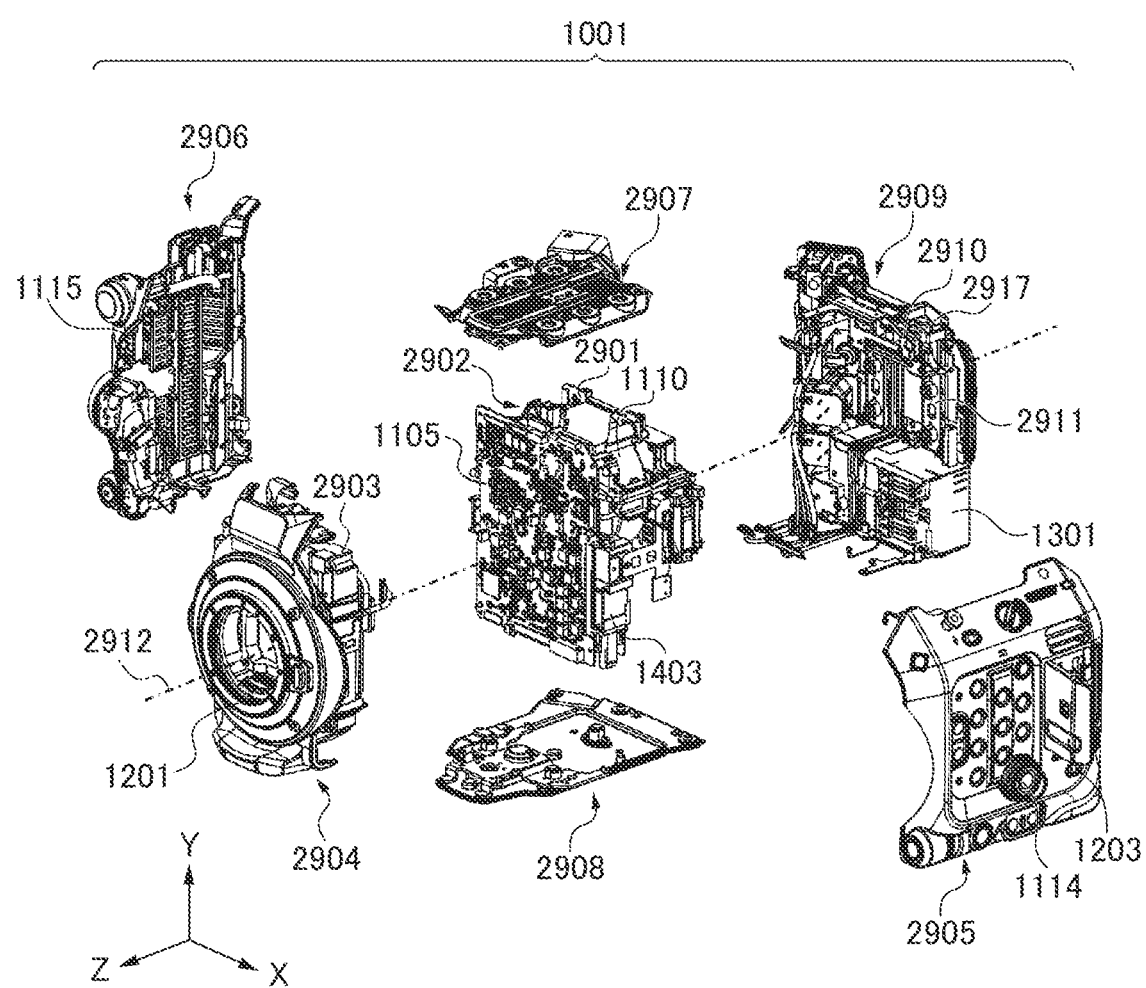
FIG. 27 is an exploded perspective view of the image capturing apparatus body.
Figure 28:
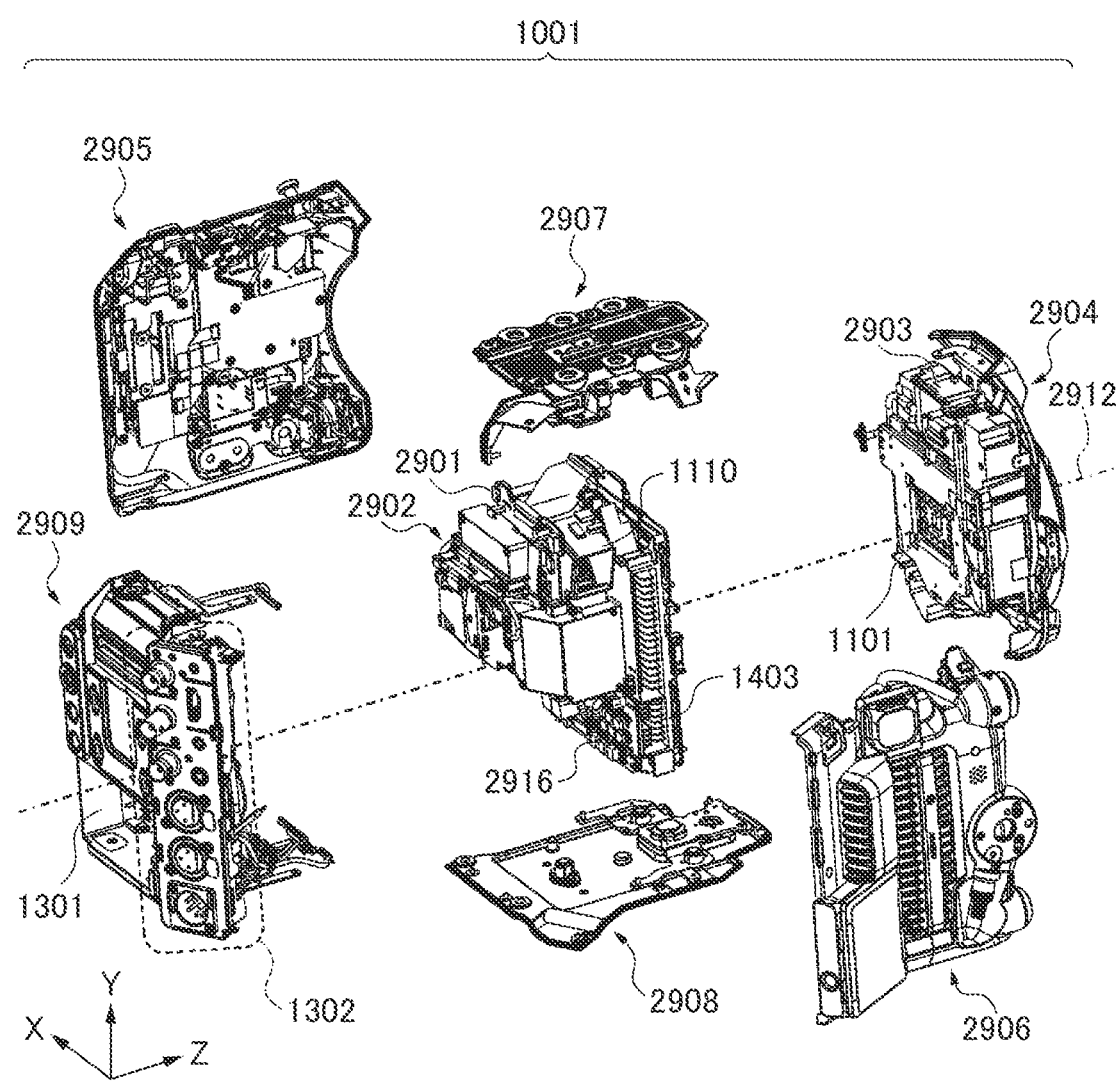
FIG. 28 is an exploded perspective view of the image capturing apparatus body.

FIGS. 27 and 28 are exploded perspective views of the apparatus body 1001. A main unit 2902 is disposed in the center of the apparatus body 1001. In the main unit 2902, the main processing circuit board 1105 on which the above-described CPU 1102, ROM 1103, and RAM 1104 are mounted is arranged. Further, in the main unit 2902, a power supply circuit board 2916 having the above-described power supply controller 1116 and an audio circuit board 2901 that performs audio processing are arranged. The main processing circuit board 1105 and the power supply circuit board 2916 are cooled by being fastened to the main duct 1403 through which wind generated by the fan 1110 flows.

A front unit 2904 is arranged on the +Z side of the main unit 2902. In the front unit 2904, not only the lens mount 1201 and the image sensor 1101, but also an ND unit 2903 capable of adjusting brightness of a shot image, etc., are arranged. On the +X side of the main unit 2902, a right cover unit 2905 having the body operation button group 1114, the accommodating cover 1203, etc., is arranged. On the −X side of the main unit 2902, a left cover unit 2906 having the speaker 1115, etc., is arranged. On the +Y side of the main unit 2902, a top cover unit 2907 is arranged, and on the −Y side of the same, a bottom cover unit 2908 is arranged. On the −Z side of the main unit 2902, a rear cover unit 2909 having the above-described battery receiving section 1301, the above-described input/output terminal group 1302, etc., is arranged.

A detection circuit board 2917 is fastened to a sheet metal 2911 of the rear cover unit 2909 with screws. On the detection circuit board 2917, a sensor 2910 used for camera shake correction and self-position estimation is mounted. This detection circuit board 2917 is arranged on the +X side of the optical axis, denoted by reference numeral 2912. Further, the detection circuit board 2917 is arranged in substantially parallel to the image sensor 1101 and the main processing circuit board 1105. The sensor 2910 is a detection element which is of one of the angular speed sensor, the acceleration sensor, and the geomagnetic sensor.

Figure 29:
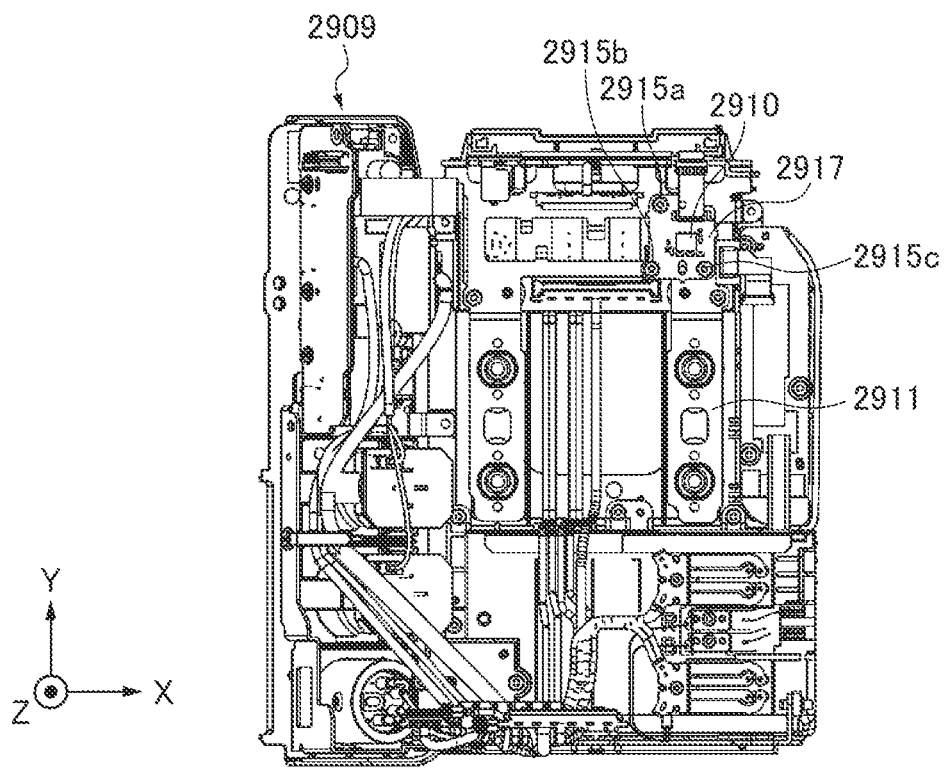
FIG. 29 is a front view of a rear cover unit.

FIG. 29 is a front view of the rear cover unit 2909. The detection circuit board 2917 is fastened to the sheet metal 2911 of the rear cover unit 2909 at three locations with a screw 2915*a*, a screw 2915*b*, and a screw 2915*c*. Note that the detection circuit board 2917 may be fastened at more than three locations.

Figure 30:
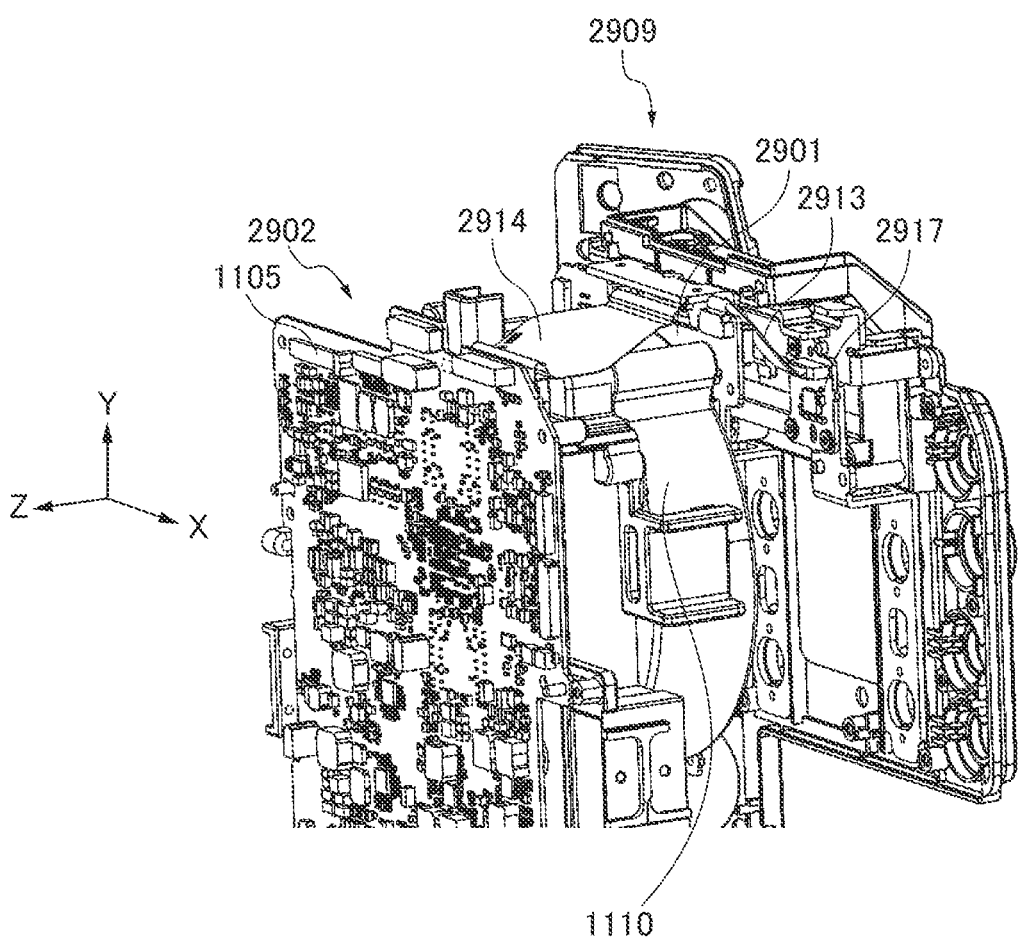
FIG. 30 is a perspective view of a main unit and the rear cover unit.

FIG. 30 is a perspective view of the main unit 2902 and the rear cover unit 2909. Electrical connection between the detection circuit board 2917 and the main processing circuit board 1105 will be described with reference to FIG. 30. The detection circuit board 2917 is connected to the audio circuit board 2901 by wires 2913. The audio circuit board 2901 is connected to the main processing circuit board 1105 by a flexible circuit board 2914. Although not shown, the detection circuit board 2917 may be connected to the main processing circuit board 1105 directly by the wires 2913.

The detection circuit board 2917 is fixed to the rear cover unit 2909 as an exterior unit located on an opposite side of the fan 1110 to the front unit 2904 in which the image sensor 1101 is arranged. Since the detection circuit board 2917 is arranged in the rear cover unit 2909, driving vibrations of the fan 1110 arranged in the main unit 2902 are difficult to be transferred to the detection circuit board 2917. Further, lens vibrations generated from the lens mount 1201 and vibrations generated from the ND unit 2903, which are arranged in the front unit 2904, are difficult to be transferred to the detection circuit board 2917. Further, operating vibrations of the body operation button group 1114 and opening/closing vibrations of the accommodating cover 1203, which are arranged in the right cover unit 2905, are difficult to be transferred to the detection circuit board 2917. Further, vibrations via an external cable, not shown, which extends through the left cover unit 2906 and is connected to the input/output terminal group 1302, are difficult to be transferred to the detection circuit board 2917.

Further, since the detection circuit board 2917 is fastened to the rear cover unit 2909 at the three or more locations with the screws, vibrations generated in the apparatus body 1001 are more difficult to be transferred to the detection circuit board 2917 than a case where the detection circuit board 2917 is fastened at one or two locations. Further, since signals output from the detection circuit board 2917 are transferred to another circuit board by the wires 2913, vibrations generated in the apparatus body 1001 are more difficult to be transferred to the detection circuit board 2917 than a case where the signals are transferred to the other circuit board by a flexible circuit board which is light in mass and low in elasticity.

For the reasons described above, in a case where the sensor 2910 is an angular velocity sensor, such as a gyro sensor, various vibrations generated in the apparatus body 1001 are difficult to be transferred to the angular velocity sensor, and hence it is possible to detect a shake with high accuracy. Further, in a case where the sensor 2910 mounted on the detection circuit board 2917 is an acceleration sensor for estimating the self-position of the apparatus body 1001, various vibrations generated in the apparatus body 1001 are difficult to be transferred to the acceleration sensor for the same reasons. Therefore, it is possible to estimate the self-position with high accuracy.

Further, by arranging the detection circuit board 2917 in the above-described location, magnetic noise generated by driving the fan 1110 arranged in the main unit 2902 is difficult to be transferred to the detection circuit board 2917 arranged in the rear cover unit 2909. Further, magnetic noise generated from the main processing circuit board 1105, an inductor and the DC-DC converter of the power supply controller 1116, etc. which are arranged in the main unit 2902 is difficult to be transferred to the detection circuit board 2917. Further, magnetic noise generated from the speaker 1115 arranged in the left cover unit 2906 is difficult to be to the detection circuit board 2917.

For the reasons described above, in a case where the sensor 2910 mounted on the detection circuit board 2917 is a geomagnetic sensor for detecting the self-posture, magnetic noise generated in the apparatus body 1001 is difficult to be transferred to the geomagnetic sensor. Therefore, it is possible to estimate the self-posture with high accuracy.

According to the present embodiment, the microphone 1106 is arranged on a right side surface different from any of the surface in which the air outlet port 1402 is arranged, the surface on which the lens mount 1201 is arranged, and the surface on which the accessory attachment portion 2203 is arranged (see FIG. 11). Further, the microphone 1106 is arranged at a location closer to the top surface (upper surface) of the apparatus body 1001 than the bottom surface of the apparatus body 1001 (see FIG. 11). This makes it possible to easily collect the voice of a shooter while reducing the influence of mechanical noise and electrical noise.

Further, the tip end male screw portion 2708 of the manual fastening screw 2702 is screwed into the rotation prevention member-fastening hole 2404 through the rotation stopper hole 2706 and the large diameter portion 2707 is fitted in the rotation stopper hole 2706. With this, the protrusion holding member 2701 is fastened to the apparatus body 1001 (see FIG. 24D). Further, the protrusion holding member 2701 holds the rotation stopper protrusion 2801 of the wireless unit 1004 in the protrusion holding hole 2705. With these, it is possible to fix the wireless unit 1004 without looseness by a simple operation such that the wireless unit 1004 is not unintentionally rotated.

Further, on the upper surface of the apparatus body 1001, the positioning hole 2601 is formed at a location overlapping the projected shadow of the body-side connection terminal 1123 which is the electrical connection portion, as viewed from the +Y side (see FIG. 23B). Further, the rotation prevention member-fastening hole 2404 is formed at a location not overlapping the projected shadow of the body-side connection terminal 1123, as viewed from the +Y side (see FIG. 23B). Further, the protection cover insertion hole 2406 is arranged on an opposite side of the body-side connection terminal 1123 to the rotation prevention member-fastening hole 2404 (see FIGS. 22, 23A, and 23B). With these, it is possible to prevent unintentional rotation of the wireless unit 1004 while ensuring size reduction of part of the apparatus body 1001 where the wireless unit 1004 is attached.

Further, the clearance L1 between the speaker holes 1404 and the grip unit 1002 is secured in the X direction (see FIG. 15). This makes it possible to ensure sound emission from the speaker holes 1404 even when the user holds the apparatus body 1001.

Further, the detection circuit board 2917 on which the sensor 2910 (detection element) is mounted is fixed to the rear cover unit 2909 on the opposite side of the fan 1110 to the image sensor 1101 (see FIGS. 28 and 29). This makes it possible to suppress the influence of vibrations of the fan 1110 on the sensor 2910 and thereby improve the detection accuracy.

Further, the body-side fastening portion 2001 for fastening the wireless unit 1004, which has thermal conductivity, is arranged adjacent to the air inlet port 1401 and is connected to the main duct 1403 (see FIG. 17). Particularly, the flat portion 2303 is fixed to the main duct 1403. This makes it possible to effectively cool the wireless unit 1004.

Note that in the present embodiment, the term "substantially" is added to an expression with no intention of excluding "complete". For example, "substantially parallel", "substantially perpendicular", "substantially orthogonal", "substantially the same", and "substantially elliptical shape" include, in their meanings, "completely parallel", "completely perpendicular", "completely orthogonal", "completely the same", and "completely elliptical shape", respectively.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-150319 filed Aug. 20, 2019, which is hereby incorporated by reference herein in its entirety.

What is claimed is:

1. An image capturing apparatus having a forced air cooling function, comprising:
    an image capturing apparatus body to which a grip unit can be rotatably attached or which includes a grip unit rotatably attached thereto;
    a lens mount which is provided on the image capturing apparatus body and to which a shooting lens can be removably attached; and
    an exterior cover on a side of the image capturing apparatus body, facing the grip unit when the grip unit has been attached to the image capturing apparatus body,
    wherein at least one speaker hole is formed in the exterior cover, and a clearance is provided between the grip unit and the at least one speaker hole.

2. The image capturing apparatus according to claim 1, wherein the clearance is secured over the whole of an angle range through which the grip unit can be rotated.

3. The image capturing apparatus according to claim 2, wherein in the angle range through which the grip unit can be rotated, as viewed from a side of the image capturing apparatus body where the grip unit is attached, an angle range within which the at least one speaker hole is hidden by the grip unit is wider than an angle range within which the at least one speaker hole is not hidden by the grip unit.

4. The image capturing apparatus according to claim 1, wherein the at least one speaker hole is located on an opposite side of the image capturing apparatus body to a side of the image capturing apparatus body on which at least one hole for collecting sound for a microphone is located.

5. An image capturing apparatus having a forced air cooling function, comprising:
    an image capturing apparatus body; and
    a lens mount which is provided on the image capturing apparatus body and to which a shooting lens can be removably attached;
    an air inlet port for drawing air used for forced cooling and an air outlet port for discharging air used for forced cooling which are provided on the image capturing apparatus body; and
    an exterior cover on a side of the image capturing apparatus body where the air inlet port and the air outlet port are provided,
    wherein at least one speaker hole is formed in the exterior cover, and is located closer to the air inlet port than the air outlet port.

* * * * *